United States Patent
Wuillemin

(10) Patent No.: US 9,831,514 B2
(45) Date of Patent: Nov. 28, 2017

(54) SOLID OXIDE FUEL CELL OR SOLID OXIDE ELECTROLYZING CELL AND METHOD FOR OPERATING SUCH A CELL

(71) Applicant: HTCERAMIX S.A., Yverdon-les-Bains (CH)

(72) Inventor: Zacharie Wuillemin, Epesses (CH)

(73) Assignee: HTCERAMIX S.A., Yverdon-les-Bains (CH)

( * ) Notice: Subject to any disclaimer, the term of this patent is extended or adjusted under 35 U.S.C. 154(b) by 0 days.

(21) Appl. No.: 15/353,963

(22) Filed: Nov. 17, 2016

(65) Prior Publication Data
US 2017/0069924 A1    Mar. 9, 2017

Related U.S. Application Data

(62) Division of application No. 14/407,363, filed as application No. PCT/EP2013/062051 on Jun. 11, 2013, now Pat. No. 9,512,525.

(30) Foreign Application Priority Data
Jun. 11, 2012    (EP) .................................... 12171565

(51) Int. Cl.
*H01M 8/04* (2016.01)
*H01M 8/24* (2016.01)
(Continued)

(52) U.S. Cl.
CPC ........... *H01M 8/04768* (2013.01); *C25B 1/02* (2013.01); *C25B 1/08* (2013.01); *C25B 1/10* (2013.01);
(Continued)

(58) Field of Classification Search
CPC ........... H01M 8/04768; H01M 8/0254; H01M 8/026; H01M 8/0267; H01M 8/04067;
(Continued)

(56) References Cited

U.S. PATENT DOCUMENTS 6,099,984 A    8/2000  Rock
6,492,053 B1   12/2002 Donelson et al.
(Continued)

FOREIGN PATENT DOCUMENTS

CN    1469500       1/2004
DE    102008043873  5/2010
(Continued)

OTHER PUBLICATIONS

International Search Report for PCT/EP2013/062051, Completed by the European Patent Office dated Sep. 12, 2013, 4 Pages.
(Continued)

*Primary Examiner* — Gregg Cantelmo
(74) *Attorney, Agent, or Firm* — Brooks Kushman P.C.

(57) ABSTRACT

A method for operating a solid oxide fuel cell having cathode-anode-electrolyte units, each including a first electrode for an oxidizing agent, a second electrode for combustible gas, and a solid electrolyte there between forming a metal interconnection between the CAE-units. The interconnect including a combustible gas distribution structure, and a second metallic gas distribution element having two channels for the oxidizing agent and separate channels for a tempering fluid. Cooling the second gas distribution element and a base layer of the first gas distribution element with the tempering fluid (O2). Measuring the first and second control temperatures T1 and T2. T1 being the tempering fluid temperature entering the fluid inlet side of the fuel cell. T2 being the tempering fluid temperature leaving the second gas distribution element. Where the amount of tempering fluid supplied to the second gas distribution element is controlled based on the difference between T1 and T2.

9 Claims, 17 Drawing Sheets

(51) Int. Cl.
  *H01M 8/02* (2016.01)
  *H01M 8/12* (2016.01)
  *C25B 1/02* (2006.01)
  *C25B 1/08* (2006.01)
  *C25B 1/10* (2006.01)
  *C25B 9/18* (2006.01)
  *C25B 15/02* (2006.01)
  *C25B 15/08* (2006.01)
  *H01M 8/04746* (2016.01)
  *H01M 8/2483* (2016.01)
  *C25B 9/20* (2006.01)
  *H01M 8/2425* (2016.01)
  *H01M 8/0258* (2016.01)
  *H01M 8/0254* (2016.01)
  *H01M 8/026* (2016.01)
  *H01M 8/0267* (2016.01)
  *H01M 8/04007* (2016.01)
  *H01M 8/04089* (2016.01)
  *H01M 8/0432* (2016.01)
  *H01M 8/04082* (2016.01)
  *H01M 8/1246* (2016.01)
  *H01M 8/124* (2016.01)

(52) U.S. Cl.
  CPC .......... *C25B 9/18* (2013.01); *C25B 9/203* (2013.01); *C25B 15/02* (2013.01); *C25B 15/08* (2013.01); *H01M 8/026* (2013.01); *H01M 8/0254* (2013.01); *H01M 8/0258* (2013.01); *H01M 8/0267* (2013.01); *H01M 8/0435* (2013.01); *H01M 8/04067* (2013.01); *H01M 8/04089* (2013.01); *H01M 8/04201* (2013.01); *H01M 8/04335* (2013.01); *H01M 8/04358* (2013.01); *H01M 8/04753* (2013.01); *H01M 8/1246* (2013.01); *H01M 8/2425* (2013.01); *H01M 8/2483* (2016.02); *H01M 2008/1293* (2013.01); *H01M 2300/0074* (2013.01); *Y02E 60/366* (2013.01); *Y02E 60/50* (2013.01); *Y02E 60/525* (2013.01); *Y02P 20/13* (2015.11)

(58) Field of Classification Search
  CPC ......... H01M 8/04201; H01M 8/04358; H01M 8/1246; H01M 8/2425; H01M 2008/1293; H01M 8/04089; H01M 8/04335; H01M 8/0435; H01M 8/04753; H01M 2300/0074; C25B 1/02; C25B 9/18; C25B 15/02; C25B 15/08; Y02P 20/13; Y02E 60/366; Y02E 60/50; Y02E 60/525
  See application file for complete search history.

(56) References Cited

U.S. PATENT DOCUMENTS

| | | |
|---|---|---|
| 6,670,068 B1 | 12/2003 | Diez |
| 7,041,408 B1 | 5/2006 | Meyers |
| 7,112,385 B2 | 9/2006 | Rock |
| 7,348,093 B2 | 3/2008 | Danzer et al. |
| 7,632,586 B2 | 12/2009 | Ihringer et al. |
| 8,043,767 B2 | 10/2011 | Benson |
| 8,501,362 B2 | 8/2013 | Amemiya |
| 8,614,029 B2 | 12/2013 | Daremas et al. |
| 9,379,407 B2 | 6/2016 | Nango et al. |
| 2003/0175577 A1 | 9/2003 | Rock |
| 2004/0151975 A1 | 8/2004 | Allen |
| 2004/0157103 A1 | 8/2004 | Takeguchi et al. |
| 2004/0209140 A1 | 10/2004 | Okazaki et al. |
| 2005/0008912 A1 | 1/2005 | Yang et al. |
| 2005/0037935 A1 | 2/2005 | Abd Elhamid et al. |
| 2005/0186464 A1 | 8/2005 | Sugiura et al. |
| 2006/0147787 A1 | 7/2006 | Yamauchi et al. |
| 2007/0048591 A1 | 3/2007 | Dong et al. |
| 2007/0207366 A1 | 9/2007 | Sommer et al. |
| 2008/0014489 A1 | 1/2008 | Nielsen et al. |
| 2008/0193812 A1 | 8/2008 | Murata et al. |
| 2008/0280177 A1 | 11/2008 | Ose et al. |
| 2010/0099001 A1 | 4/2010 | Owejan et al. |
| 2011/0136033 A1 | 6/2011 | Chen et al. |
| 2011/0207022 A1 | 8/2011 | Wieser et al. |
| 2011/0269048 A1 | 11/2011 | Reinert |
| 2015/0132677 A1 | 5/2015 | Wuillemin |
| 2015/0176140 A1 | 6/2015 | Wuillemin |

FOREIGN PATENT DOCUMENTS

| | | |
|---|---|---|
| EP | 1286404 | 2/2003 |
| EP | 1498967 | 1/2005 |
| EP | 1742285 | 1/2007 |
| EP | 1830426 | 9/2007 |
| EP | 1864347 | 11/2009 |
| EP | 2267829 | 12/2010 |
| JP | S55130078 | 10/1980 |
| JP | 2003514354 | 4/2003 |
| JP | 2005276532 | 10/2005 |
| JP | 2008529211 | 7/2008 |
| JP | 2009158407 | 7/2009 |
| JP | 2010176939 | 8/2010 |
| JP | 2010257834 | 11/2010 |
| RU | 2422951 | 6/2011 |
| WO | 9634421 | 10/1996 |
| WO | 0148852 | 7/2001 |
| WO | 0191218 | 11/2001 |
| WO | 2004021488 | 3/2004 |
| WO | 2006048429 | 5/2006 |
| WO | 2009111771 | 9/2009 |
| WO | 2009142994 | 11/2009 |

OTHER PUBLICATIONS

Cornu et al. Fuel Cells 2011, vol. 11, No. 4, p. 553-564, "Impact of Random Geometric Distortions on the Perfromance and Reliability of an SOFC."

Russian Search Report for Russian Application No. RU 2014149663, Completed by the Russian Patent Office, dated Mar. 22, 2017, 4 Pages.

SOLID OXIDE FUEL CELL OR SOLID OXIDE ELECTROLYZING CELL AND METHOD FOR OPERATING SUCH A CELL

CROSS-REFERENCE TO RELATED APPLICATION

This application is a division of U.S. application Ser. No. 14/407,363 filed Dec. 11, 2014 now U.S. Pat. No. 9,512,525 issued Dec. 6, 2016, which claims priority to U.S. national phase of PCT Application No. PCT/EP2013/062051 filed on Jun. 11, 2013, which claims priority to EP Patent Application No. 12171565.0 filed on Jun. 11, 2012, the disclosures of which are incorporated in their entirety by reference herein.

TECHNICAL FIELD

The invention concerns a solid oxide fuel cell or a solid oxide electrolyzing cell. The invention further concerns a method for operating a solid oxide fuel cell or a solid oxide electrolyzing cell.

BACKGROUND

A fuel cell is a device that generates electricity by a chemical reaction. Among various fuel cells, solid oxide fuel cells (SOFC) use a hard, ceramic compound of metal (e.g., calcium or zirconium) oxide as an electrolyte. Typically, in solid oxide fuel cells, an oxidizing agent, such as $0_2$, is reduced to oxygen ions ($0^2-$) at the cathode, and a combustible gas, such as H2 gas, is oxidized with the oxygen ions to form water at the anode.

A SOFC fuel cell comprises a stack of fuel cell units. A SOFC fuel cell unit consists of two major components, a cathode-anode-electrolyte-unit, also referred to as CAE-unit, and an interconnect, having the form of a cassette in some cases. The interconnect serves to connect the CAE-unit of one fuel cell unit electrically to the CAE-unit of another fuel cell unit, so that the electrical power that each CAE-unit generates can be combined. Such interconnects have in planar High-Temperature Fuel Cells (SOFCs) the function to electrically connect the CAE-unit as well as to transport the combustible gas and the oxidizing agent to the respective electrodes of the CAE-unit.

Because the interconnect is exposed to both the oxidizing and reducing side of the CAE-unit at very high temperatures of about 500° C. up to 1100° C., interconnects are one of the critical issues of solid oxide fuel cells. For this reason, ceramics have in the past been more successful in the long term than metals as interconnect materials. However, these ceramic interconnect materials are very expensive as compared to metals. While metal interconnects are relatively easy to fabricate and process, they generally suffer from high power degradation rates partly due to formation of metal oxides, such as $Cr_2O_3$, at an interconnect-anode/cathode interface during operation. Nickel- and steel-based alloys are becoming more promising as lower temperature (600-800° C.) SOFCs are developed.

U.S. Pat. No. 7,632,586 B2 discloses an interconnect for a combustible gas and an oxidizing agent. The planar CAE units are positioned one above the other with interconnecting layers formed as planar metal plates arranged in between neighboring CAE units. The respective passages for fuel and oxidant are formed in the anode and cathode layers.

Due to the very high operating temperatures of a SOFC fuel cell stack the effects of thermal expansion and the thermomechanical behavior of the CAE unit and the interconnect structures for supplying the CAE unit with the reactants and conducting the reactants away therefrom have to be taken into account. In particular, the gas distribution structures may undergo some creep, which affects the distribution of flows in the fuel cell. Moreover, the electrodes and interfaces tend to degrade as soon as excessive temperatures are reached.

U.S. Pat. No. 6,670,068 B1 discloses a SOFC fuel cell stack. Thus a plurality of CAE units are in electrically conductive contact with an interconnector, the interconnector comprising a contact plate and a fluid guiding element which is formed as shaped sheet metal part and connected to the contact plate in a fluid-tight manner by welding or soldering. Thereby the contact plate defines a fluid chamber having a combustible gas or an oxidizing agent flowing through it during operation of the fuel cell unit. The shaped sheet metal part is disposed with a plurality of corrugations giving it a wave-like structure. The wave-like structure as such may compensate for some of the thermal expansion of the CAE unit and of the fluid guiding element in operation. However due to the local contact of the wave peaks or wave troughs with the respective electrode, the fluid guiding element has to follow the thermal expansion of the electrode. If the fluid guiding element does not have sufficient elasticity the strain due to thermal expansion is introduced into the electrode. The electrodes are formed from solid, brittle ceramics. Thus, if a high strain is introduced into the electrodes, cracks may be formed, which will ultimately destroy the electrode. In addition the welding or soldering connection provided between the fluid guiding element and the anode also contributes to the stiffness of the construction. In particular if materials having a different coefficient of thermal expansions are used, the strains may finally lead to damages of the electrode and may damage the cell membrane concerned. In particular the flow of reactants may be altered or direct mixing of them can occur if the cell membrane is broken, leading to spontaneous combustion. Thus locally hot spots may form, which may induce local thermal expansion and thus further development of local stress.

Therefore, there is a need for development of improved interconnects for solid oxide fuel cells, addressing one or more of the aforementioned problems, so that more reliable and efficient solid oxide fuel cells are achieved.

Thus it is an object of the invention to improve existing SOFC fuel cells, to make them more reliable, and to allow cheaper manufacturing.

SUMMARY

The dependent claims concern further advantageous configurations or embodiments of the invention. The object of the invention is further obtained by a method for operating a solid oxide fuel cell. Dependent claims relate to further advantageous method steps.

The object of the invention is in particular obtained by a solid oxide fuel cell, comprising a plurality of cathode-anode-electrolyte units, each CAE-unit comprising
 a first electrode for an oxidizing agent,
 a second electrode for a combustible gas,
 and a solid electrolyte between the first electrode and the second electrode, and
b) a metal interconnect between the CAE-units, the interconnect including:

a first gas distribution element comprising a gas distribution structure for the combustible gas, wherein the first gas distribution element is in contact with the second electrode of the CAE-unit, and a second gas distribution element comprising channels for the oxidizing agent and comprising separate channels for a tempering fluid, wherein the channels for the oxidizing agent are in contact with the first electrode of an adjacent CAE-unit, and the first gas distribution element and the second gas distribution element being electrically connected.

The object of the invention is further in particular obtained by a method for operating a solid oxide fuel cell or a solid oxide electrolyzing cell, the cell comprising
 a) a plurality of cathode-anode-electrolyte units and
 b) a metal interconnect between the CAE-units, the interconnect including:
  a first gas distribution element comprising a gas distribution structure for the combustible gas, and
  a second gas distribution element comprising channels for the oxidizing agent and comprising separate channels for a tempering fluid,
  wherein at least a first and a second control temperature are measured,
  the first temperature being the temperature of the tempering fluid entering the second gas distribution element or any representative temperature measured on the tempering fluid inlet side of the fuel cell,
  and the second temperature being the temperature of one of the exit temperature of the tempering fluid leaving the second gas distribution element, the temperature of the fuel cell stack or any representative temperature measured on the tempering fluid outlet side of the fuel cell, wherein the amount of tempering fluid supplied to the second gas distribution element is controlled based on a temperature difference of the first and second temperature.

The invention in this application is described by disclosing a solid oxide fuel cell (SOFC). The embodiment according to the invention could also be used as a solid oxide electrolyzing cell (SOEC). By describing a solid oxide fuel cell herein, also the same embodiment used as an electrolyzing device is meant also, and is also covered by the claims, unless specifically specified.

A solid oxide fuel cell according to the invention comprises a plurality of cathode-anode-electrolyte units and a metal interconnect between each of the CAE-units, the interconnect including:

a first gas distribution element comprising a gas distribution structure for the combustible gas, wherein the first gas distribution element is in contact with the CAE-unit, and a second gas distribution element comprising channels for the oxidizing agent and comprising separate channels for a tempering fluid, wherein the channels for the oxidizing agent are in contact with the adjacent CAE-unit, and wherein the first gas distribution element and the second gas distribution element being electrically connected. The interconnect therefore serves to electrically connect a CAE-unit with an adjacent CAE-unit. In addition, the interconnect further serves to transport the combustible gas and the oxidizing agent. The interconnect further comprises a channels for a tempering fluid, to cool (mostly SOFC units) or the heat (mostly SOEC units) in particular the CAE-unit.

In a preferred embodiment the first gas distribution element for a fuel cell (or an electrolyzing device) comprises a first layer and a second layer, said first and second layers are disposed with a gas distribution structure forming a pattern for combustible gas. An inlet opening is provided for the combustible gas to the gas distribution structure formed between the first layer and the second layer by said pattern and an outlet opening is provided for discharging reaction products from the gas distribution structure. A supporting layer, which is the second gas distribution element, is provided for tempering the first layer for regulating the temperature of the reactant fluid or of the first layer and thus provide a homogeneous temperature distribution to the reactant fluid flowing through the gas distribution structure.

If the expression "or" is used in this application for combining two alternatives, both the combination of both alternatives as well as the presence of only one of the alternatives is to be understood. If it is not specifically referred to a fuel cell, the features may be applied to either fuel cells or electrolyzing devices.

Advantageously, the second gas distribution element, also referred to as the supporting layer, is arranged on a side of the first gas distribution element, the second gas distribution element extending on a side opposite to the first gas distribution structure. In particular, the first and/or second gas distribution structure can be configured as a channel system.

According to an embodiment, the second gas distribution element is disposed with a plurality of corrugations. In particular, the corrugations can form a plurality of passages in particular extending parallel to each other. According to a variant the passages can open towards the first layer, first gas distribution element. In particular, the passages can have one of a wave profile, a zig-zag profile or a profile of trapezoidal cross-section. Alternatively or in combination therewith, the passages are shaped as closed channels, in particular tubular channels. Such tubular channels can in particular have a circular or a rectangular cross-section. The passages can extend substantially along the main direction of flow from the inlet opening to the outlet opening.

According to an embodiment the first gas distribution element comprises a first and a second layer, whereby the second layer is a homogenizing element, which has apertures, which have a length and a width, with the length being greater than the width and the length extending in a transverse direction to the main direction of fluid flow. The pattern for the reactant fluid flow of said first layer can comprise at least one of a plurality of channels, three dimensional structures, such as pins, grid structures, foam structures. In a further embodiment the channels of the first layer are at least partially be obstructed by at least a bar element. According to an embodiment at least some of the second apertures of the second layer are shaped as perforations, wherein the length of the second apertures is greater than the width of the bar element, so that the second apertures may bypass the bar element.

A method for operating a solid oxide fuel cell thus comprises the steps of letting a combustible gas flow through the first gas distribution element, and an oxidizing agent along the second gas distribution element. The first gas distribution element comprises a first layer and a second layer, said first and second layers are disposed with a pattern for a fluid flow, such that a first gas distribution structure is formed on at least one of the first or second layers. An oxidizing agent flows in the second gas distribution element, the second gas distribution element being electrically connected with the first gas distribution element. The second gas distribution element is advantageously provided for tempering the first layer, the combustible gas and the CAE unit.

If the method is applied to a solid oxide fuel cell, the combustible gas fluid provides a source for electrons to the cathode-anode-electrolyte unit and the oxidizing agent provides charge carrying ions to the cathode-electrolyte anode unit, such that the charge-carrying ions can cross the electrolyte and that an electrochemical reaction can be performed at the electrolyte whereby electrons are freed to generate an electric current. The electrons are supplied or discharged via the interconnect providing an electrically conductive pathway between two CAE-units.

The first and second gas distribution elements for a solid oxide fuel cell (SOFC) enable the appropriate distribution of the combustible gas and the oxidizing agent, thus gas on the fuel electrode of the fuel cell as well as proper electrical contact with the latter. This invention thus concerns also the gas distribution element and its construction in a fuel cell or electrolyzing device stack. The fuel cell is usually configured as a fuel cell stack composed of a plurality of unit cells. The unit cells are combined in a modular fashion into such a fuel cell stack as to achieve the voltage and power output level required for the application. The stacking thus involves connecting multiple unit cells in series via electrically conductive interconnects. A unit cell can be in particular configured as a cell membrane.

For a solid oxide fuel cell or an electrolyzing device it is essential that the combustible gas is homogeneously distributed over the fuel electrode in order to maximize its efficiency and guarantee a reliable operation. This requires that the gas distribution structure of the first gas distribution element, such as a channel system or a porous structure, presents a homogeneous resistance to gas flow, thus an even pressure drop. For the channel structures, this requires usually the provision of a very precise geometry, involving very tight fabrication tolerances and incurring therefore high manufacturing costs.

The ceramic gas diffusion layer which is placed on either side of the solid oxide fuel cell which, in turn, is sandwiched between two metallic interconnects reduces the cost of the overall stack by making it less complex and less expensive to manufacture as far as materials are concerned.

According to an embodiment, the gas distribution structure of the first layer is at least partially obstructed by at least a bar element. The bar element is to be considered as an obstacle to the fluid flow through the gas distribution structure of the first layer. The bar element can be any type of barrier or throttle element, which forces the fluid flow to deviate from proceeding in the main direction of fluid flow, or that creates a local restriction of the hydraulic diameter of the flow channels.

At least some of the first or the second apertures of the second layer can be shaped as perforations, in particular as holes. The first and second layers thus form a gas distribution element, which is composed of at least one sheet metal. In the gas distribution element, the at least one sheet metal layer forms a channel structure facing the perforated layer. The particularity of the perforated layer is to present a series of elongated holes extending substantially perpendicular to the fuel distribution channels and allowing mixing the gas of several channels in the near environment at regular intervals along the flow direction.

Advantageously the length of the perforations is greater than the width of the bar element. Either the first or second reactant fluid can thus pass over the obstacle formed by the bar element and therefore the flow deviates from the main direction of flow allowing for a mixing of the stream through one channel with streams passing through adjacent channels. According to an embodiment, a portion of the apertures, in particular shaped as perforations, has a length greater than the width and either the length or the width extends in the main direction of fluid flow. In particular the width of the first apertures extends in the main direction of fluid flow or the length of the second apertures extends in the main direction of fluid flow. The gas distribution structure arranged on the first layer and at least one the first apertures and second apertures are in fluid contact.

A supporting layer, forming an additional layer, can be provided for an even distribution of either one of the first or second reactant fluids onto an electrode. According to an embodiment a plurality of inlet openings for the respective reactant fluid are provided on at least one of the first and second layers. By providing a plurality of inlet openings, a more even distribution of fluid flow can be obtained. A further advantage is the more even distribution of heat, thus allowing making efficient use of the entire reactive surface provided by the CAE unit.

Furthermore gas distribution structures forming the pattern for fluid flow, in particular at least some of the first or second apertures can be manufactured by stamping, or etching. According to an alternative embodiment, the supporting layer forms a monolithic piece with the first layer. According to an embodiment, the first layer comprises a first sheet containing perforations and a second sheet forming the base layer. The supporting layer can be arranged on the opposite side of the base layer or of the first layer.

Furthermore, the invention concerns fuel cell or an electrolyzing device comprising a gas distribution element according any one of the preceding embodiments.

In particular, the total open area of the first apertures is at least 20% of the total contact surface of the negative electrode of the cathode-anode-electrolyte unit, preferably at least about 30% of the total contact surface, most preferred at least about 50% of the total contact surface. Thereby a lateral distribution of the gas flowing through the gas distribution element is obtained, which allows for a more homogeneous fluid distribution and consequently of a more uniform fluid temperature.

Primary applications for SOFCs are in the fields of remote power, distributed power generation, Combined Heat and Power (CHP), Auxiliary Power Units (APUs) for trucks, buses, and ships, portable power and efficient biogas conversion.

BRIEF DESCRIPTION OF THE DRAWINGS

These and other features and advantages of the invention will be more fully understood and appreciated from the following description of certain exemplary embodiments of the invention taken together with the accompanying drawings, in which like numerals represent like compounds. The invention is described in detail in combination with a fuel cell. It is obvious that the invention also covers an electrolyzing device.

DETAILED DESCRIPTION

Figure 1:
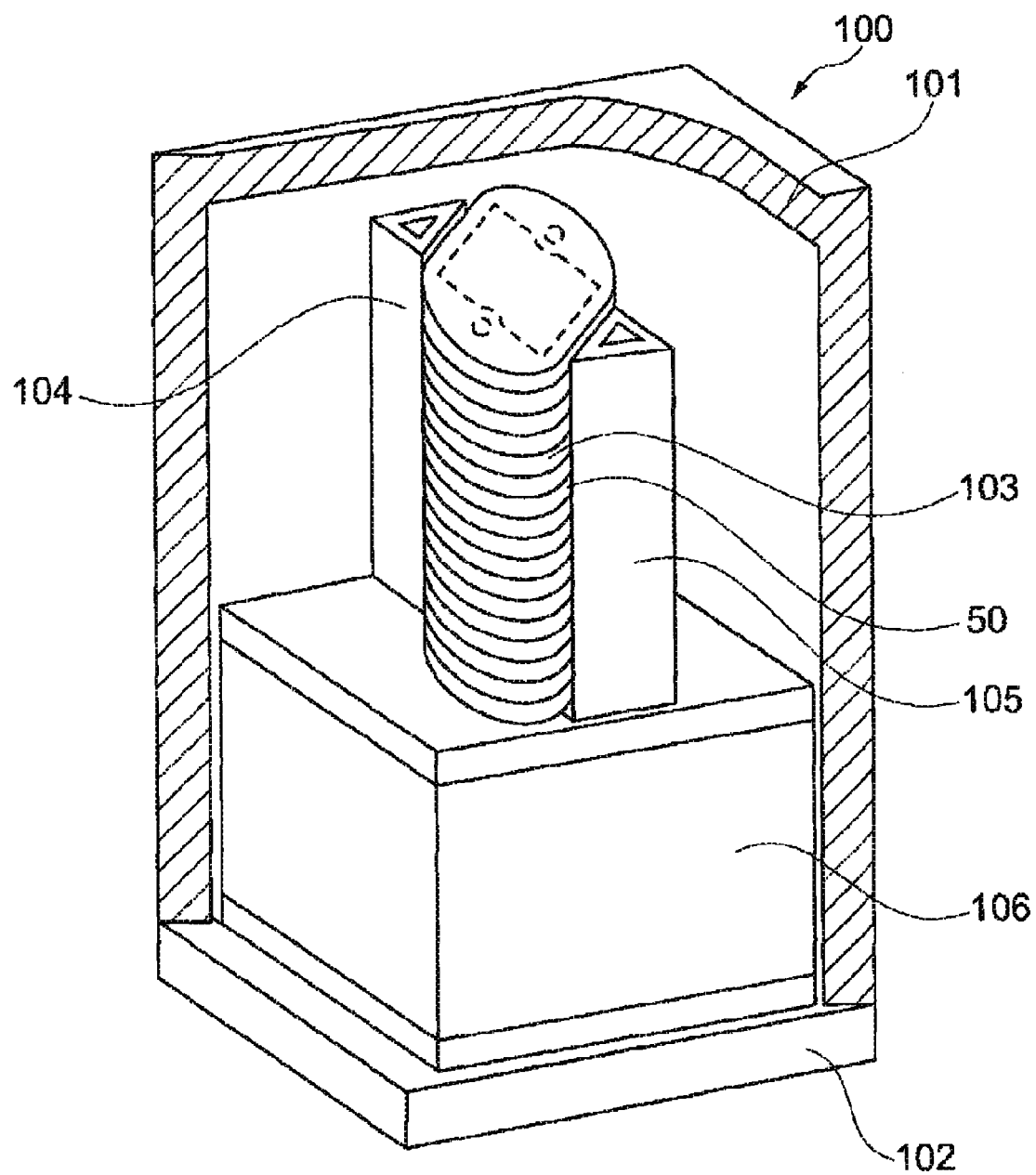
FIG. 1 is a schematic view of a SOFC system.

FIG. 1 shows a solid oxide fuel cell (SOFC) system 100 according to the invention. The solid oxide fuel cell system comprises a casing 101, which contains a fuel cell stack 103 being composed of a plurality of fuel cell units 50, whereby the fuel cell units are herein also termed unit cells 50. The casing rests on a basement 102. The fuel cell system or balance of plant includes a heat exchanger 106 for heating the reactants as well as reactant preparation units for providing the reactants in the correct composition and the correct flow rate to the fuel cell, which are not shown in the drawings. The stacks are disposed with reactant discharge elements 104, 105.

The stack can be configured as shown in U.S. Pat. No. 7,632,586 B2, where a particular electrode contacting and gas distribution structure is applied. In the prior art, a stack based on this technology has been developed for remote and micro-Combined Heat and Power (CHP) applications of about 1 kW. It is characterized by low pressure drops and can achieve power densities of 1 kW/l or 400 mW/cm$^2$ with electrical efficiencies of above 45%. The stacks can be fueled with reformed natural gas, reformate gas or hydrogen. This stack manifolds the air externally and the fuel internally and recovers the fuel exhaust stream. The exhaust stream can be used in post combustion or recycled for reforming (given adapted balance of plant). The use of U.S. Pat. No. 7,632,586 B2 improves the thermal cycling tolerance of the stack, avoiding additional performance degradation due to thermal cycling.

With two recent prototypes combining the present invention with the technology disclosed U.S. Pat. No. 7,632,586 B2, an improved performance was measured. A maximum fuel conversion of 94% was attained with efficiencies reaching 61% using hydrogen as fuel and 69% using methane. Moreover, up to 50 thermal cycles were attained without significant damage on a short stack of that combined type. This is far above earlier results based on the sole handling of reactant flow as disclosed in U.S. Pat. No. 7,632,586 B2.

Figure 2:
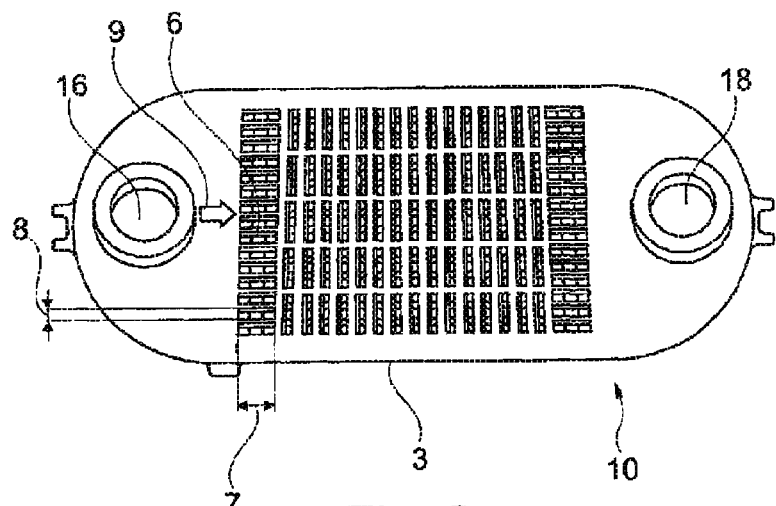
FIG. 2 is an isometric view on a first gas distribution element.

For the distribution of combustible gas a first gas distribution element 10 is foreseen which is depicted in detail in FIG. 2. An interconnect 40 comprises a first gas distribution element 10 and a second gas distribution element 4. The interconnect 40 is usually arranged between two neighboring cathode-anode electrolyte units 5. Under a unit cell 50, a unit comprising a cathode-anode-electrolyte unit 5, and the interconnect 40 is to be understood.

The first gas distribution element 10 is used for providing at least the combustible gas to the respective electrode.

The second gas distribution element 4 is used for providing the reactant containing oxygen, which means the oxidizing agent to the respective electrode. The first gas distribution element 10 disclosed in FIG. 2 comprises a fuel inlet 16 and a fuel outlet 18, so that the fuel provided by inlet 16 flows within the first gas distribution element 10 in linear direction of flow 9 from the inlet 16 to the outlet 18. In FIG. 2 a first layer 2 is arranged below a second layer 3.

For the operation as a fuel cell, the reactant containing oxygen is supplied to the positive oxygen electrode 51 acting as a cathode.

For an operation of the unit cell 50 as an electrolyzing device, the reactant containing oxygen is supplied to the same positive oxygen electrode 51 acting as an anode In an advantageous embodiment the gas distribution element 10 is used for providing a combustible gas to the negative electrode 53 of the CAE cathode-anode-electrolyte unit 5. The interconnect 40 further comprises a second gas distribution element 4 comprising fluid conducting channels for the reactant containing oxygen, allowing to put in contact the reactant containing oxygen with the positive oxygen electrode 51 of a neighboring CAE cathode-anode-electrolyte unit 5.

In most cases the oxygen-containing reactant is air, however also pure oxygen or an oxygen containing gas may be supplied to the interconnect 40. The second reactant, the combustible gas, usually contains any mixture of $H_2$, CO, $H_2O$, $CO_2$, methane, ammonia, other hydrocarbons or optional diluents.

In a preferred embodiment, the combustible gas is distributed inside the gas distribution element 10. The negative electrode 53 of the CAE cathode-anode-electrolyte unit 5 is thus facing a second layer 3 of the gas distribution element 10.

The first gas distribution element 10 can also be used for an electrolyzing device operating in the inverse way. For the operation as a fuel cell, the reactant containing oxygen is supplied to the positive oxygen electrode acting as a cathode.

For an operation of the unit cell as an electrolyzing device, the reactant containing oxygen is supplied to the positive oxygen electrode acting as an anode.

The interconnect 40 combines two essential functions of the fuel cell stack 103: it accomplishes current collection from the electrodes 51,53 and it manifolds the reactant, in particular the fuel and also the oxygen containing gas between and on the CAE cathode-anode-electrolyte unit 5.

Figure 3:
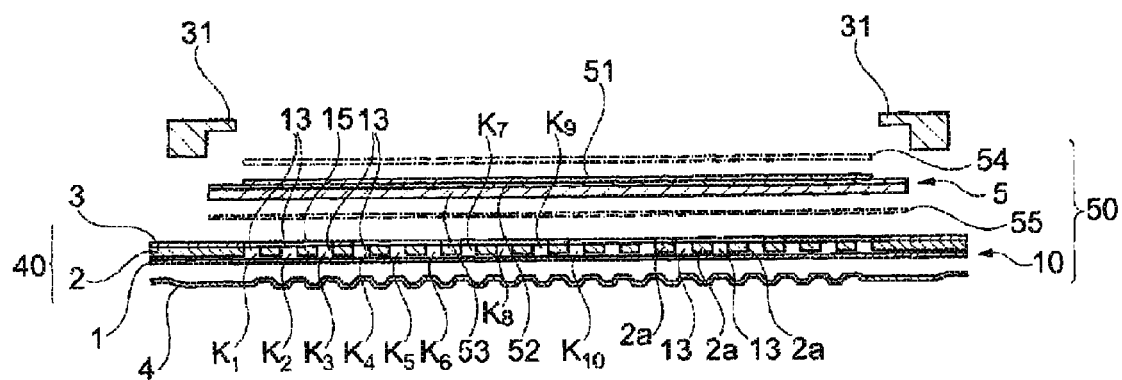
FIG. 3 a cross-sectional view of a unit cell according to a first embodiment of the invention, FIG. 4 an explosion view of the unit cell of FIG. 3, FIG. 4A an enlarged view of a second gas distribution element, FIG. 4B an explosion view of a further embodiment of a first gas distribution element, FIG. 4C an explosion view of a further embodiment of a first gas distribution element, FIG. 4D a further embodiment of a second layer, the homogenizing layer, FIG. 4E a further embodiment of a second layer, the homogenizing layer, FIG. 4F a further embodiment of a unit cell comprising a first and a second gas distribution element, FIG. 4G a section through the second gas distribution element, FIG. 4H a further embodiment of a second gas distribution element, FIG. 5 a partial top view of two neighboring layers of a gas distribution element, FIG. 6A a partial top view of a perforated layer of a gas distribution element, FIG. 6B a section along line A-A of FIG. 6A, FIG. 6C a section along line B-B of FIG. 6A, FIG. 6D an enlarged section of an ideal gas distribution element along line C-C of FIG. 4 but without the supporting layer, FIG. 6E a section of a gas distribution element without a homogenizing layer, FIG. 6F an enlarged section along line C-C of FIG. 4 of a gas distribution element comprising a homogenizing layer, FIG. 6G a schematic view showing ideal conditions of flow of a combustible gas through a gas distribution element, FIG. 6H a schematic view showing real conditions of flow of a combustible gas through a gas distribution element, FIG. 6I a schematic view showing real conditions of flow of a combustible gas through a further gas distribution element, FIG. 6K a section of a gas distribution element without a homogenizing layer, FIG. 6L a section of a similar gas distribution element as shown in FIG. 6K but the gas distribution element comprising a homogenizing layer, FIG. 7A a schematic view showing ideal conditions of flow of a combustible gas through a gas distribution layer of a fuel cell unit, FIG. 7B a schematic view showing optimal designed real conditions of flow of the combustible gas through a fuel cell unit, FIG. 7C a schematic view showing conditions of flow of the combustible gas through a fuel cell unit according to the prior art, FIG. 7D a view on a stack of fuel cell units with a flow according to conditions shown in FIG. 7B, FIG. 7E a view on a stack of fuel cell units with a flow according to conditions shown in FIG. 7C, FIG. 8 a section though a plurality of consecutive layers of fuel cell units of a stack, FIG. 8A a detailed section view of FIG. 8, FIG. 8B a section of a schematic side view of a fuel cell stack, FIG. 8C a section of a schematic side view of a further embodiment of a fuel cell stack.

As disclosed in FIG. 3 the interconnect 40 thus allows to integrate the gas distribution of the unit cell 50, allowing the use of thin, not machined metallic sheets as shown by reference numbers 1,2,3 and/or 4, which for example may be manufactured by stamping, punching, roll-forming, embossing or etching, which means cheap manufacturing, instead of expensive, structured bi-polar plates. The base layer 1 and/or the first layer 2 and/or the second layer 3 and/or the supporting layer 4 can be manufactured by stamping, embossing, punching or etching or by hot pressing, or other processes such as powder metallurgy. The first gas distribution element 10 may be manufactured such that the base layer 1, the first layer 2, the second layer 3 or any combination thereof are joined together by any suitable bonding technique such as welding, brazing or reactive bonding, or any combination thereof, for electrical contacting and/or sealing. In a similar way the second gas distribution element 4 may be manufactures by forming the supporting layer or by combining the supporting layer with the base layer 1.

The proposed fuel cell stack 103 includes according to a preferred application between 1 and 100 unit cells 50, corresponding to 16-5000 W nominal electrical power.

The embodiment shown in FIG. 3 shows a sectional view of an arrangement of a unit cell 50 comprising a cathode-anode-electrolyte unit 5 and a interconnect 40, the interconnect comprising the first gas distribution element 10 and the second gas distribution element 4.

The first gas distribution element 10 according to the embodiment shown in FIG. 3 consists of a base layer 1, a second layer 3 and a first layer 2. The cathode-anode-electrolyte unit 5 comprises a first electrode 51, a second electrode 53 and an electrolyte 52 sandwiched between the first and second electrodes 51, 53. The unit cell 50 further comprises lateral seals 31, which provide a gas tight seal for the edges of the cathode-anode electrolyte unit 5 and the contacting layers 55 and the gas distribution element 10. The unit cell 50 further comprises the second gas distribution element 4 for supplying the first reactant fluid containing oxygen to the first electrode 51. The second reactant fluid comprising the fuel is supplied to the second electrode 53 above the first layer 2 respectively the second layer 3.

Figure 4:
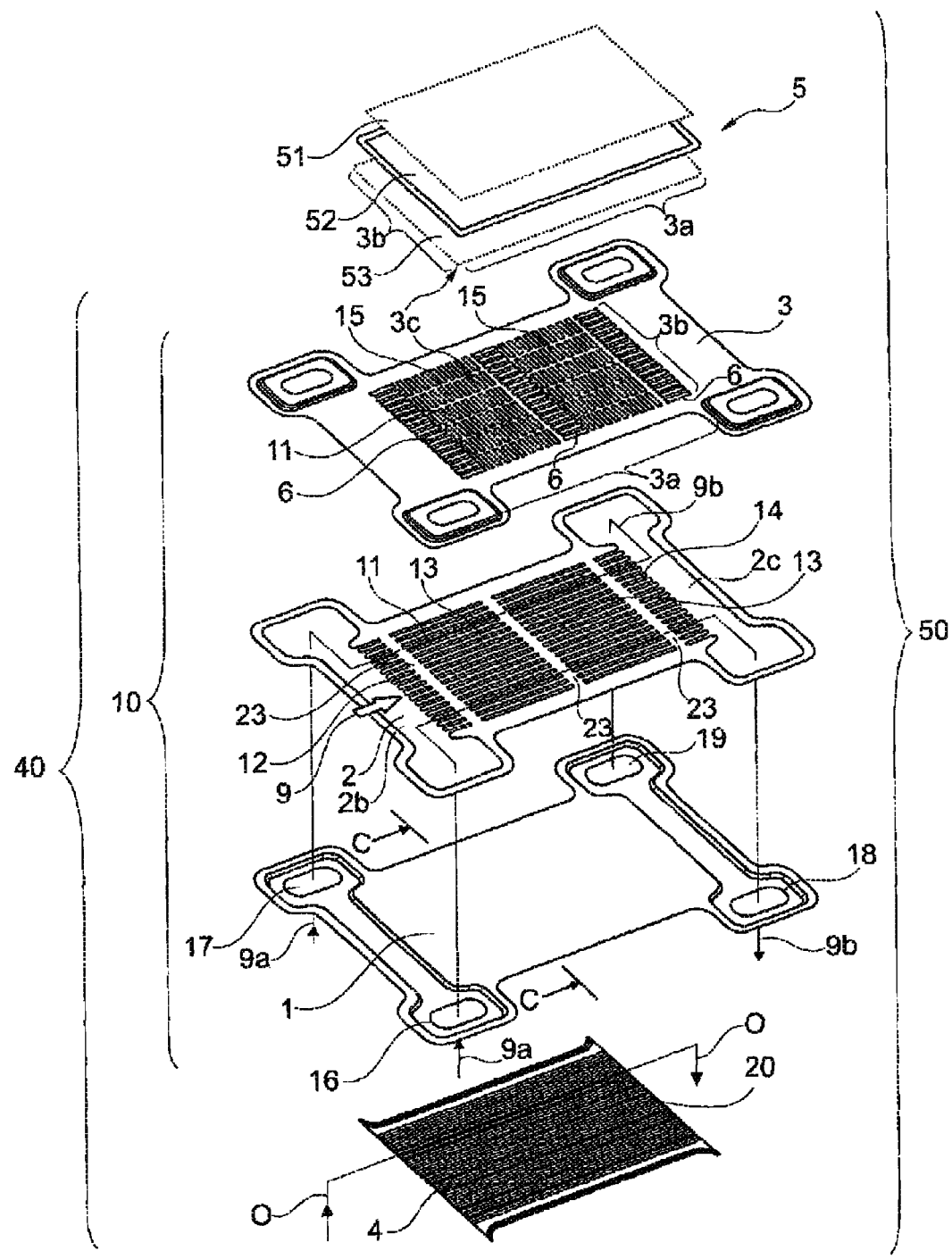

FIG. 4 shows an explosion view of a fuel cell unit 50 comprising a CAE-unit 5 and an interconnect 40. The CAE unit 5 comprises a first electrode 51, a second electrode 53 and an electrolyte 52 sandwiched between the first and second electrodes 51, 53. Usually a ceramic and/or metallic gas diffusion layer 54,55 is arranged on both sides of the electrodes 51,53, which is not shown in FIG. 4, but which for example is shown in FIG. 8A.

The example of a first gas distribution element 10 shown in FIG. 4 comprises a base layer 1, a first layer 2 and a second layer 3; said first 2 and second layers 3 are disposed with a gas distribution structure 11 forming pattern for a fluid flow. The first layer 2, disclosed in FIG. 4, defines a flow pattern by a number of channels 13 laying one beside the other, so that the combustible gas entering the first layer 2 may flow in the main direction of flow 9. The channels 13 extend in linear direction. The channels 13 preferably start on one side of the first layer 2 at an entrance side 2b, also called inlet, and the channels 13 preferably end on the other side of the first layer 2, at the exit side 2c, also called outlet, whereby the entrance side 2b is connected with a combustible gas supply 9a, and whereby the outlet 2c is fluidly connected to an exhaust gas exit 9b. FIG. 4 also shows the second gas distribution element 4, which in the example shown is a corrugated sheet of metal, having channels 20, as disclosed in FIG. 4A. In FIG. 3 a sectional view of the fuel cell unit 50 along line C-C can be seen. The first gas distribution element 10 is explained. The first layer 2 comprising a plurality of spaced channel bars 2a forming channels 13 there between. As disclosed in FIG. 4 the first layer 2 may comprise further channels 12, 14 extending in linear direction, and which fluidly connect the channels 13 with the inlet 2b respectively the outlet 2c.

The second layer 3 is a homogenizing element comprising apertures 15 which fluidly connect at least two channels 13 laying one beside the other, to compensate and to homogenize the amount of fluid in the respective channels 13. In FIG. 3 an aperture 15 is disclosed fluidly connecting three channels 13. The second layer 3 has first apertures 15 which are configured as rectangular openings having a length 28 and a width 29. The length is greater than the width. The length 28 extends transversely to the main direction of fluid flow 9; the width 29 extends in the main direction of fluid flow 9. The second layer 3 may also have second apertures 6 which have a length 7 and a width 8, with the length 7 being greater than the width 8 and the width 8 extending in a transverse direction to the main direction of fluid flow 9.

The first layer 2, also called channel layer, has a plurality of inlet channels 12, a plurality of consecutive channels 13 and a plurality of outlet channels 14. Consecutive channels 12 and 13 are separated by a bar element 23. Consecutive channels 13 and 14 are also separated by a bar element 23. The bar elements 23 are necessary to connect the bars 2a.

These second apertures 6 of the second layer 3 form channel-like structures, which are arranged in particular rectangular or inclined to the inlet channels 12 arranged in the first layer 2. This has the advantage, that the fluid flowing inside the channels 12, 13, 14 of the first layer 2 may be directed by a bar element 23, which is part of the first layer 2, arranged on the first layer towards the aperture 6 of the second layer 3, as disclosed in FIG. 2. The aperture 6 thus forms a fluid passage between consecutive channels 12 and 13, or between consecutive channels 13 and 13, or between consecutive channels 13 and 14 by traversing the bar element 23 trough aperture 6. Whenever the fluid flows over the bar element 23 it enters the aperture 6 above the bar element 23 and is distributed into a consecutive channel 13, respectively 14. One advantage of such an embodiment is that the first layer 2 and the second layer 3 can be manufactured very cheap by using thin metal sheets.

Advantageously each inlet channel 12 is continued with a consecutive channel 13 and an outlet channel 14. These channels 12, 13, 14 may have the same cross-section and may be arranged one behind each other. Advantageously a plurality of inlet channels 12, consecutive channels 13 and outlet channels 14 are foreseen as disclosed in FIG. 4. Each of the inlet channels 12 may be arranged parallel to the corresponding neighboring inlet channel 12, the same may apply also to the consecutive channels 13 or outlet channels 14.

The first layer 2 and the second layer 3 may be formed on separate sheets as shown in FIG. 4; however, they may also be combined into a single sheet.

Furthermore the first layer 2 may be manufactured as a sheet having perforations corresponding to the channels 12, 13, 14 and being arranged beside a base sheet 1 forming the base for the channels 12, 13, 14. This solution can be advantageous for the manufacture of the channels. Furthermore a considerable variety of shapes is available for the perforations. The perforations may be conveniently punched out of the sheet, laser cut or also etched or formed as lost inserts that are removed after casting or molding the layer. Thus foreseeing a base layer 1 and the second layer 3 as separate sheets may provide a simplification in manufacture or the application of a greater variety of manufacturing methods to manufacture the layers 1, 2, 3.

Furthermore two inlet openings 16, 17 are provided for the reactant comprising the fuel, which is the combustible gas, to enter the gas distribution element 10. In addition two outlet openings 18, 19 may be provided for the fluid reaction product, which is the waste gas, to leave the gas distribution element 10.

Figure 4A:
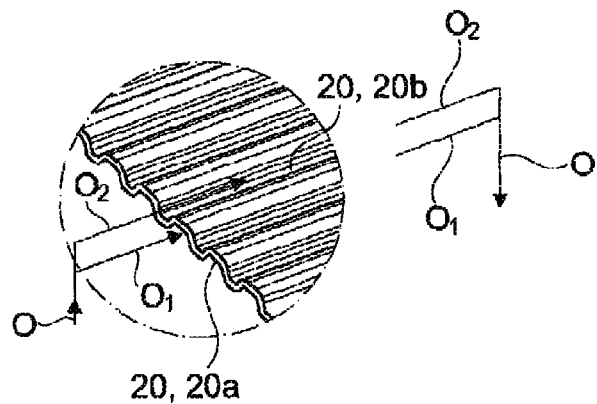

In a preferred embodiment the second gas distribution element 4 is arranged on the side of the base layer 1 and is connected with the base layer 1. FIG. 4 shows the flow path of the oxidizing agent O, the supporting layer having channels 20 on both sides, which are channels 20a, 20b. FIG. 4A shows an enlarged view of a preferred structure of the supporting layer 4, whereby the flow path of the oxidizing agent O is split be the channels 20a, 20b in two flow paths O1, O2, so that each path flowing in a channel 20 along one side of the supporting layer 4.

Figure 4B:
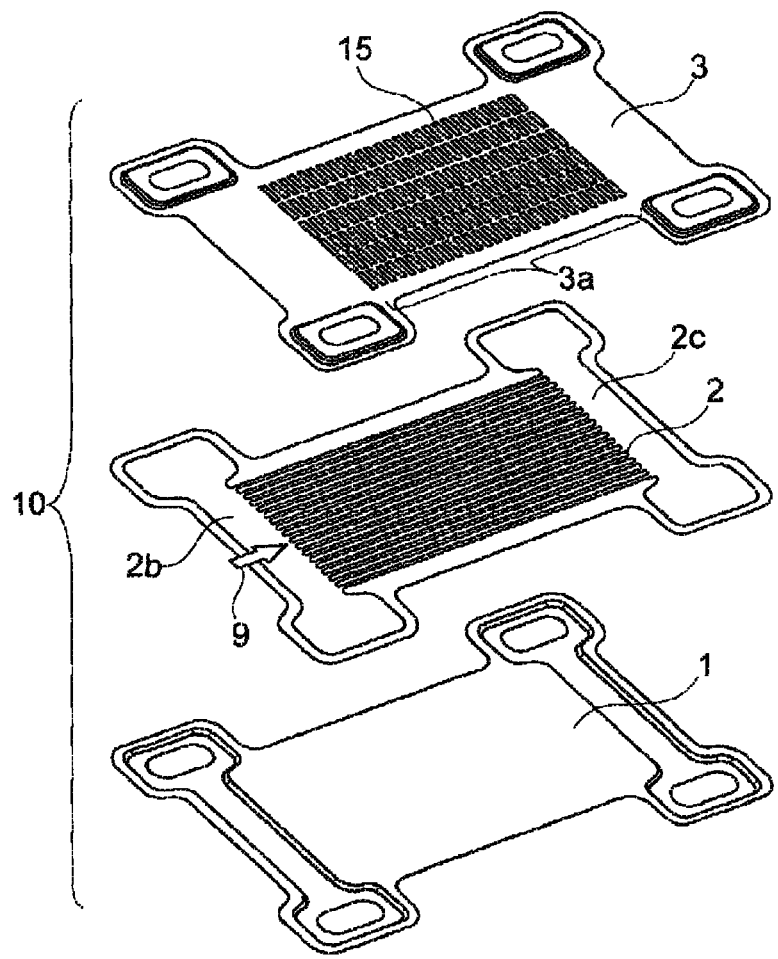

FIG. 4B shows a further embodiment of a gas distribution element 10. The base layer 1 and the first layer 2 defining the flow pattern being made of one single part. In this embodiment there is no need for bar elements 23 holding the bars 2a, because the bars 2a are connected with the base layer 1, so that the plurality of channels 13 extend in linear direction, one beside the other, whereby the channels 13 start at the entrance side 2b and end at the exit side 2c, so that the channels fluidly connect the entrance side 2b with the exit side 2c. Because the bar element 23 are not needed, also the apertures 6 to fluidly connect consecutive channels 12,13,14 are not needed in the second layer 3, as disclosed in FIG. 4B.

Figure 4C:
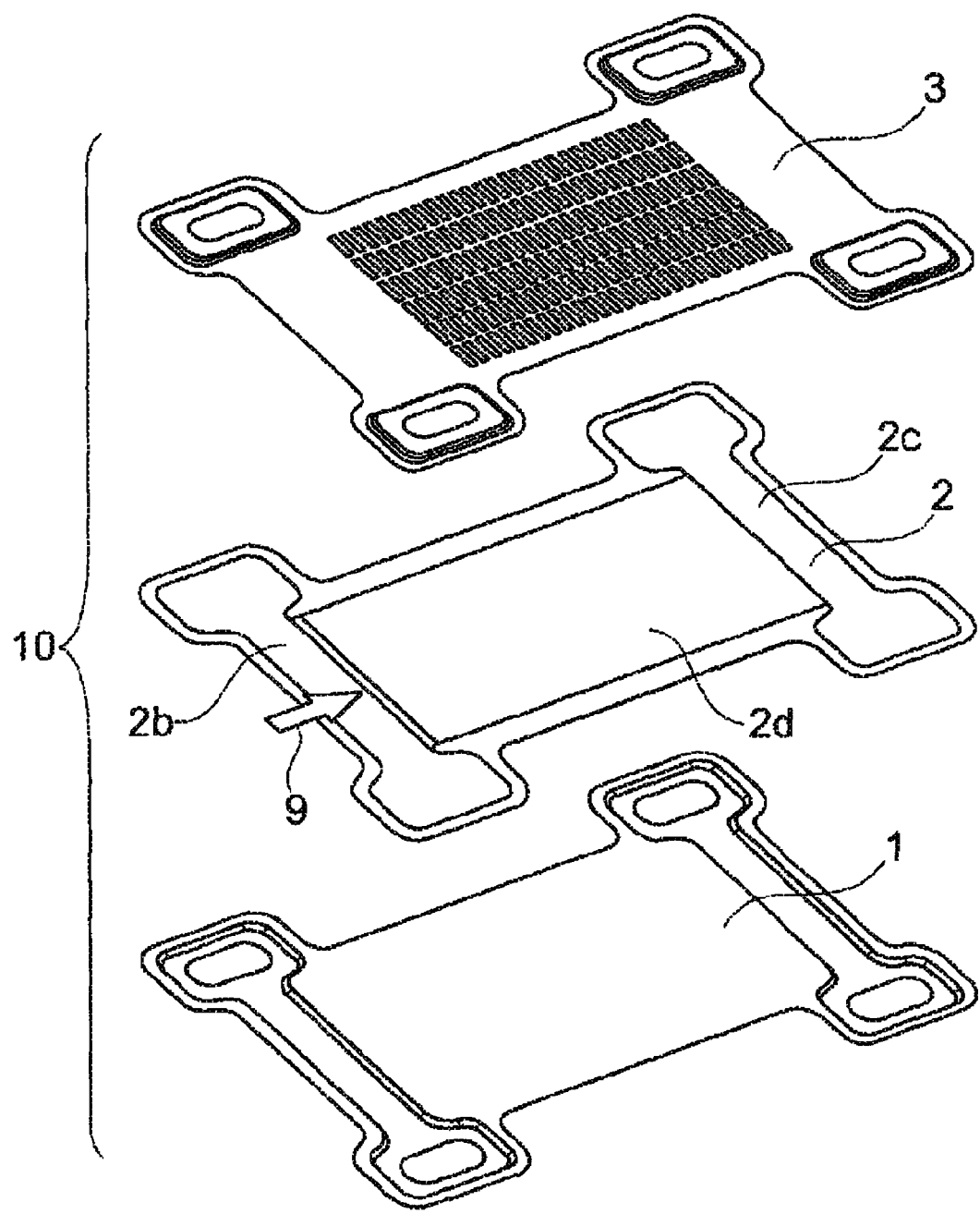

FIG. 4C shows a further embodiment of a gas distribution element 10. The first layer 2 comprises a porous structure 2d, such as a piece of metallic foam or metal mesh, whereby the porous structure being arranged on the base layer 1. The first layer 2 defining a flow path starting at the entrance side 2b and ending at the exit side 2c, so that the porous structure fluidly connects the entrance side 2b with the exit side 2c, so that the porous structure defining a flow path extending in linear direction.

Figure 4D:
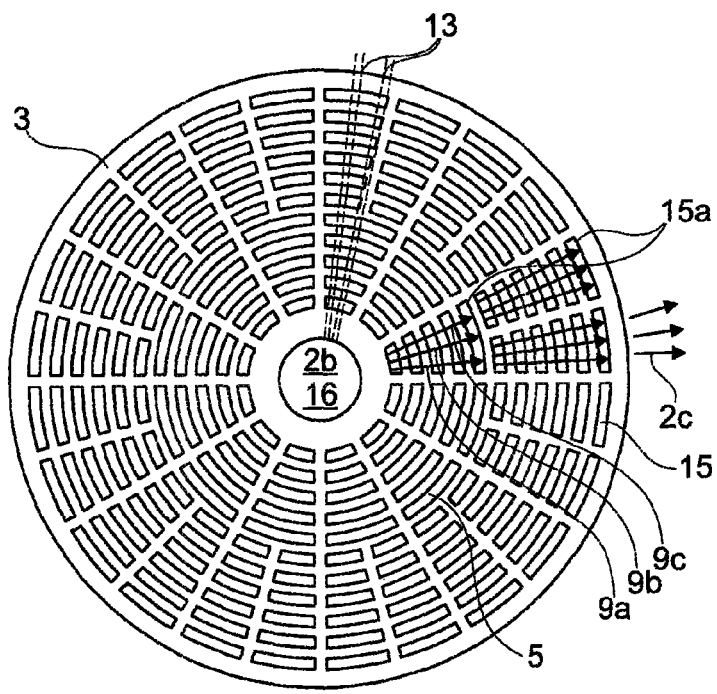

FIG. 4D shows a further embodiment of a second layer 3, a homogenizer element. In contrast to the embodiment disclosed in FIG. 4B, showing a second layer 3 of rectangular shape, FIG. 4D shows a second layer 3 of circular shape. In contrast to the embodiment disclosed in FIG. 4B, showing a first layer 2 of rectangular shape with parallel extending channels 13, a first layer adapted to the second layer 3 disclosed in FIG. 4D would have a circular shape and comprising channels 13 extending linear in radial direction, starting in the center at the fuel inlet 2b, which is at the same location as the fuel inlet opening 16, and ending at the periphery, where a fuel outlet 2c is arranged that preferably totally surrounds the first and second layer 2,3, so that the combustible gas 9a within the first gas distribution element 10 flows in radial direction. Only a few of the channels 13 are shown in FIG. 4D. The second layer 3 comprises a plurality of apertures 15 extending in circumferential direction, the apertures 15 transversely crossing the channels 13 of the first layer 2, so that some of adjacent channels 13 are fluidly connected by respective apertures 15. A first gas distribution element 10 comprising a first and second layer 2,3 as disclosed in FIG. 4D is therefore of circular shape. To build a circular fuel cell unit 50, a circular cathode-anode-electrolyte unit 5 can be arranged on top of the second layer 3, and a supporting layer 4 could be arranged below the first layer 2, so that a fuel cell unit 50 is achieved, similar to the one disclosed in FIG. 4, but with radially extending channels 13 in the first layer 2, and radially extending channels 20 in the supporting layer 4. The first layer 2 arranged beneath the second laser 3 may also be a three dimensional structure such as pins, grid, mesh structures or foam structures, the first layer 2 having a circular shape and a direction of fluid flow 9a, 9b, 9c extending in radial, in particular in linear direction from an inlet 2b to an outlet 2c, and the first apertures 15 of the second layer 3 extending in circumferential direction. In an advantageous embodiment there are no channels within the foam structure, but the porous structure of the foam allows a fluid to flow within the foam so that the fluid is flowing in a direction of fluid flow 9a,9b,9c within the first layer 2.

Figure 4E:
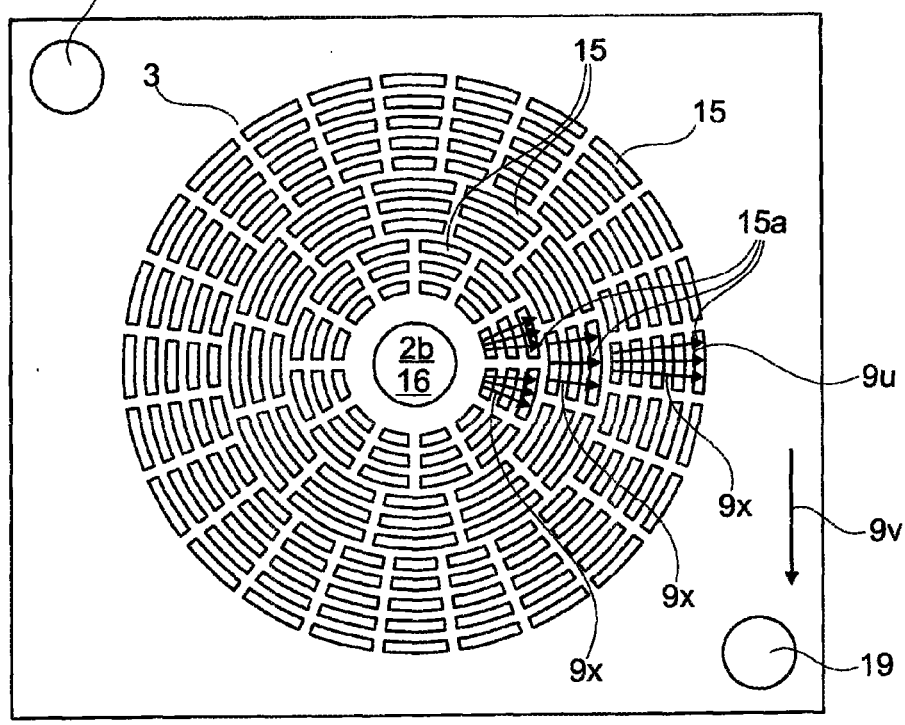

FIG. 4E shows a further embodiment of a second layer 3 of rectangular shape comprising apertures 15 extending in circular direction. In contrast to the second layer 3 disclosed in FIG. 4D, the apertures 15 of the second layer 3 disclosed in FIG. 4E are arranged in three groups 9x of apertures 15 of similar dimensions, whereby these groups 9x are displace respective to each other in circumferential direction. Such an arrangement of apertures 15 increases the homogenizing effect on the flux of the fuel passing the channels 13. The second layer 3 disclosed in FIG. 4E comprises a circumferential fuel outlet 2c collecting the waste gas to the fuel outlet ports 18/19 so that the fuel in the first layer 2 may first flow in radial direction 9u and then in direction 9v to the fuel outlet 2c.

Figure 4F:
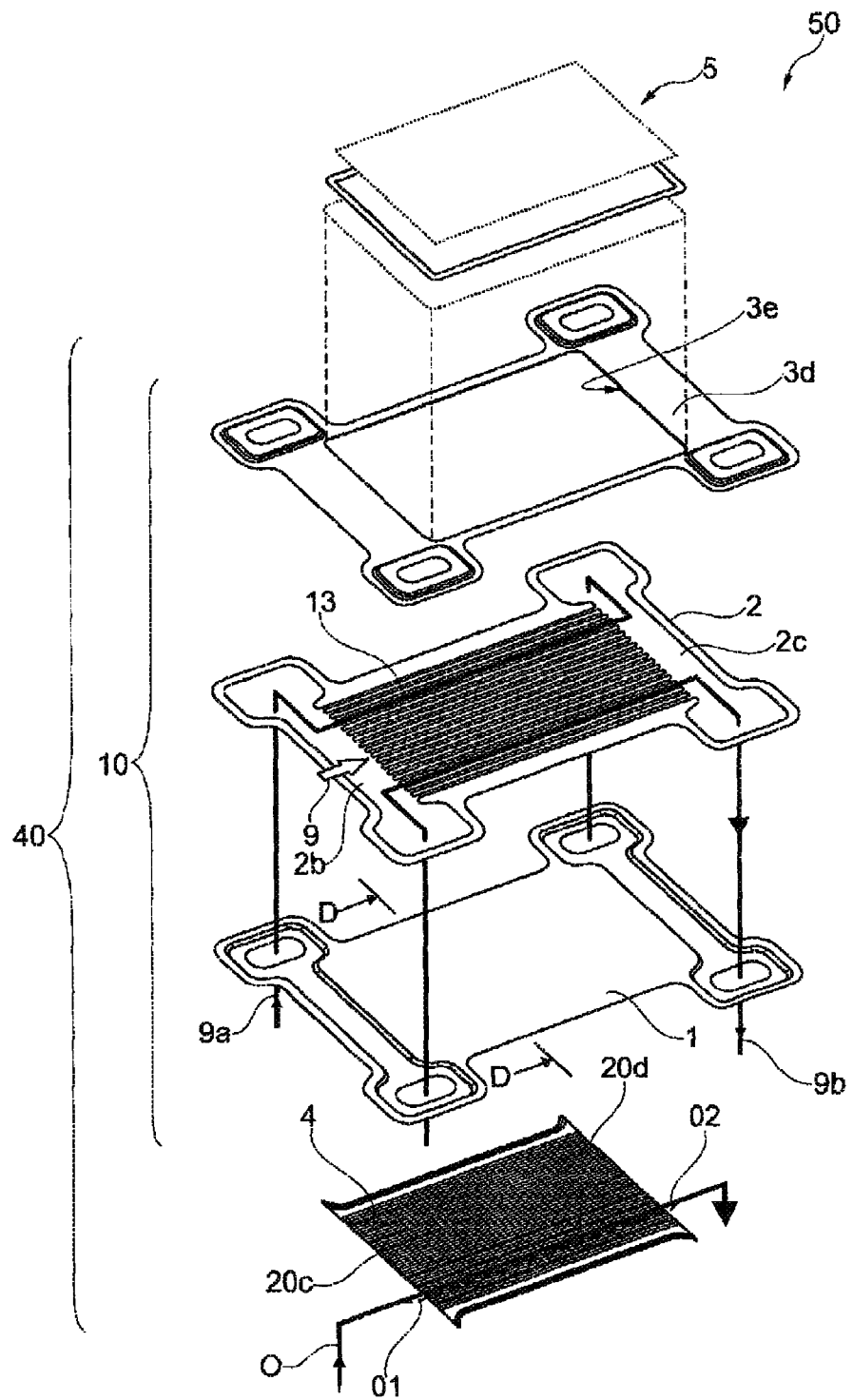

FIG. 4F shows a further embodiment of a fuel cell unit 50 comprising a CAE-unit 5 and a interconnect 40. The interconnect 40 comprising a first gas distribution element 10 and a second gas distribution element 4. The first gas distribution element 10 consisting of a base plate 1 on which the channels 13 are fixed, and consisting of a sealing layer 3d with an aperture 3e. The aperture 3e is adapted to the size of the CAE-unit 5, so that the CAE-unit may be introduced into the aperture 3e, so that the CAE-unit 5 can be arranged just above the channels 13. The second distribution element 4 is built as already disclosed in FIG. 4. In contrast to the embodiments disclosed in FIGS. 4, 4B and 4C, the first gas distribution element 10 disclosed in FIG. 4F does not comprise a second layer 3, which means does not comprise a homogenizing layer 3.

Figure 4G:
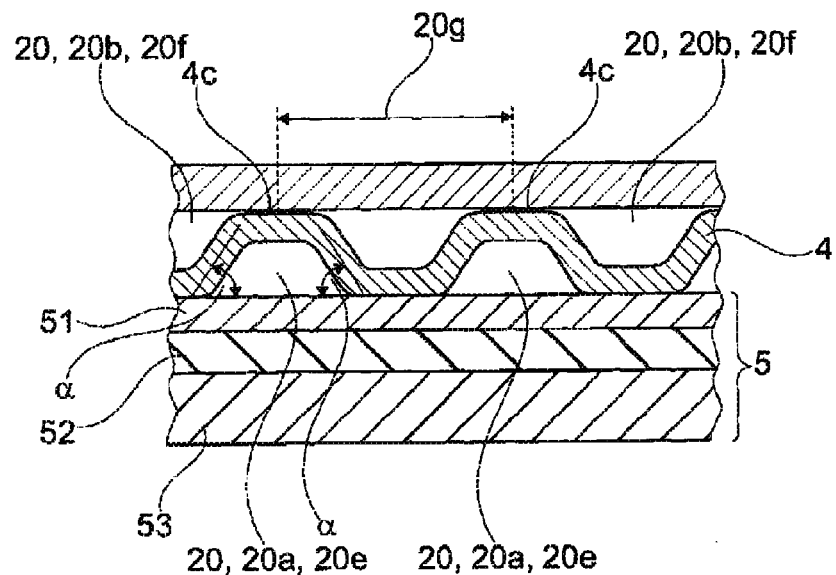

FIG. 4G shows a section along the line D-D of FIG. 4F in detail, whereby FIG. 4G also includes a CAE-unit 5 arranged below the second gas distribution element 4, which is not shown in FIG. 4F. FIG. 4G shows the corrugated sheet of metal in detail, which is arranged between the CAE-unit 5 and the base layer 1. The second gas distribution element 4 is connected by connections 4c such with the base layer 1, that electricity may be flow between the second gas distribution element 4 and the base layer 1. They for example may be welded together at the connections 4c. The corrugated sheet has a wave profile, a zig-zag profile or a profile of trapezoidal cross-section. The corrugations having a pitch 20g, the pitch 20g being in the range of 2 mm to 8 mm. A small pitch 20g has the advantage, that electricity flowing between the corrugated sheet and a position at the electrolyte 52 where the electrochemical reaction takes place undergoes a lower ohmic resistance, because there is a higher density of contacting points between the corrugated sheet and the CAE-unit 5. On the other hand a small pitch causes the channels 20, 20a, 20b to be very small, which increases the flow resistance of the fluid flowing in the channels 20.

The sheet metal thickness of element 4 is in the range of 0.3-1 mm, more preferably between 0.3 . . . 0.6 mm, and most preferably 0.5 mm.

In a preferred embodiment, the channels 20a for the oxidizing agent have a cross sectional area 20f, and the channels 20b for the tempering fluid have a cross sectional area 20e. The ratio of the two cross sectional areas 20e, 20f is in the range of 1:2 to 2:1, preferably 1:1.

In a preferred embodiment the channels 20a for the oxidizing agent and the channels 20b for the tempering fluid have a height in the range between 1 to 5 mm.

In a preferred embodiment the corrugations have a gradient angle (α) of at least 45°, more preferably larger than 60°.

In a preferred embodiment, the channels 13 of the first gas distribution element 10 extend from a fuel inlet side 2a to a fuel outlet side 2b thereby defining a direction of flow 9 of the combustible gas within the first gas distribution element 10, whereby the channels 20a, 20b of the second gas distribution element 4 either extend substantially along the main direction of flow 9 or extend substantially perpendicular to the main direction of flow 9.

As disclosed in FIG. 4G, in a preferred embodiment, the channels 20b for the tempering fluid are in contact with the first gas distribution element 10, which means the channels 20b are facing the first gas distribution element 10, respectively the base layer 1, so that there is a direct contact of the tempering fluid flowing in channels 20b with base layer 1.

In a preferred embodiment the corrugations form a plurality of channels 20a, 20b extending parallel to each other.

In a preferred embodiment the second gas distribution element 4 is connected to the first gas distribution element 10 in such a way that the channels 20b for the tempering fluid are shaped as closed channels, comprising only a entrance end 20c and an exit end 20d. This is achieved by connecting the corrugated sheet in such a way with the base layer 1, that each channel 20b forms a gas tight channel between its entrance end 20c and its exit end 20d.

Figure 4H:
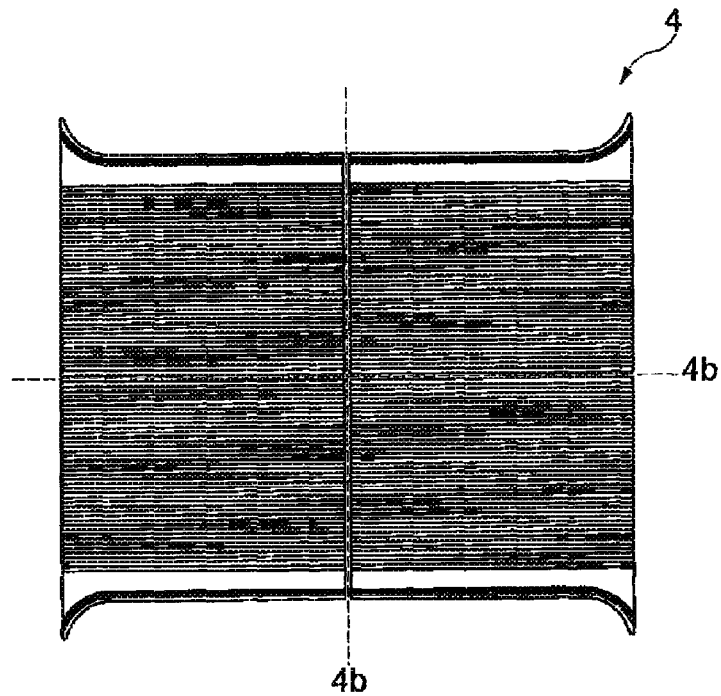

In an advantageous embodiment the second gas distribution element 4 consists of at least two parts, the at least two parts being separated from each other by a split 4b having a gap width of at least 0.3 mm. FIG. 4H discloses such a second gas distribution element 4 consisting of four parts, and having two splits 4b.

Figure 5:
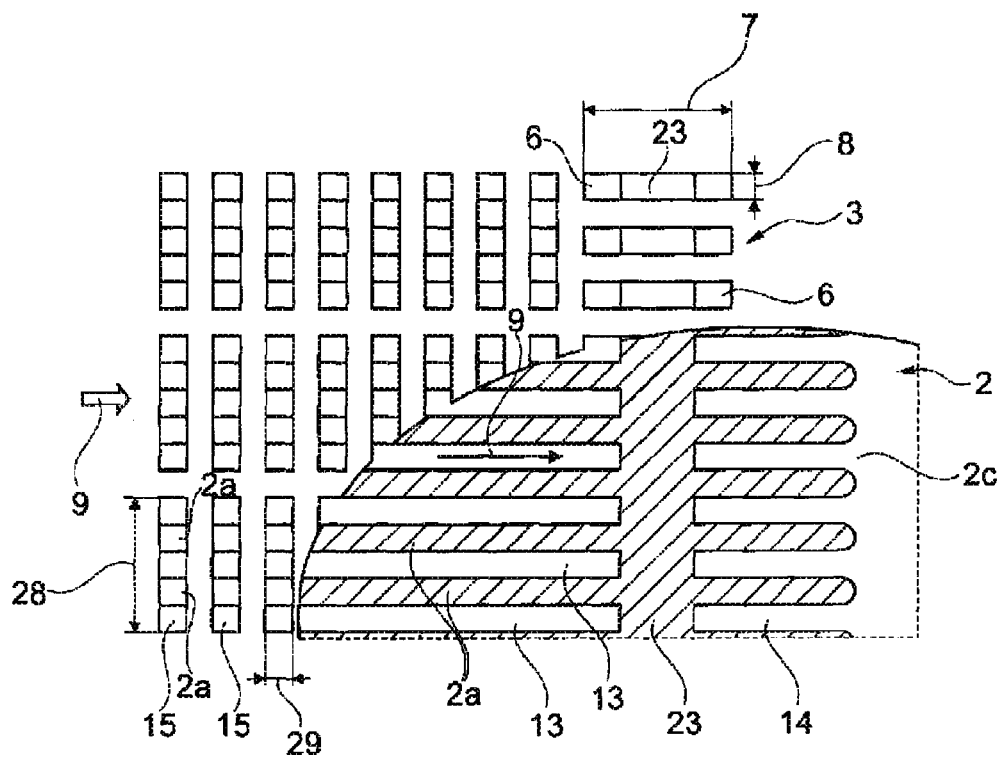

FIG. 5 shows a partial top view of the first and second layers 2, 3 of a first gas distribution element 10 of a third embodiment in a view as partial cut from the top side of the gas distribution element 10. The cross sectional view of a portion of the first layer 2 shows some of the channels 13, one beside the other and separated by a channel bar 2a and some of the consecutive outlet channels 14, separated by the bar element 23 from the channels 13. The first layer 2 is arranged behind the second layer 3. The second layer 3 contains first apertures 15 having length 28 and a width 29 with the length 28 extending transverse, in this embodiment perpendicular, to the main direction of fluid flow 9.

Figures 6A, 6B, 6C:
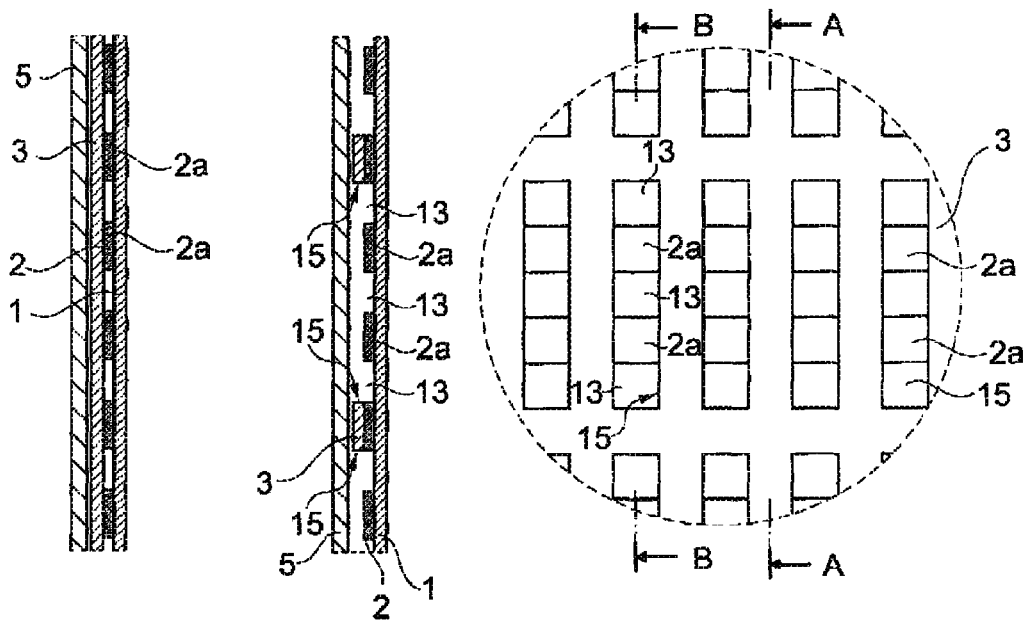

FIG. 6A shows a partial top view of a perforated second layer 3 of a gas distribution layer 10 according to any of the first, second or third embodiments of the invention, comprising first apertures 15 and underlying channel bars 2a. FIG. 6B, a section along line A-A of FIG. 6A, shows the cathode-anode-electrolyte unit 5, the first layer 2 comprising channel bars 2a, the second layer 3 and the base layer 1. The base layer 1 and the first layer 2 are manufactured from distinct sheets. FIG. 6C shows a section along line B-B of FIG. 6A. As a difference to FIG. 6B the section traverses a row of apertures 15, therefore the second layer 3 is interrupted by the apertures 15. Furthermore the parallel extending channels 13 in the first layer 2 are shown.

Figure 6D:
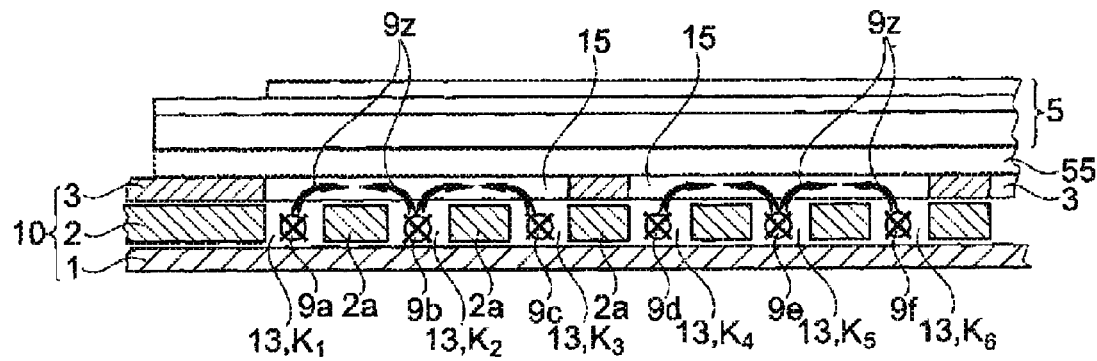

FIG. 6D shows a section along line C-C of FIG. 4, without the supporting layer 4, in detail. The first gas distribution element 10 consisting of three layers, the base layer 1, on top of which the first layer 2 is arranged, defining the flow pattern comprising a plurality of channels 13 separated by bars 2a extending parallel in flow direction 9. The second layer 3, which is the homogenizing layer, is arranged on top of the first layer 2. The second layer 3 comprising first apertures 15 extending perpendicular to the flow direction 9. In the embodiment shown, the first apertures 15 extend over three channels 13, to fluidly connect the three channels 13, so that a fluid exchange 9z might take place between the three combustible gas streams 9a, 9b, 9c; 9d,9e, 9f and through the first apertures 15. FIG. 6D shows an ideal first gas distribution element 10 in that each of the channels 13, K1 . . . K6 have identical width and identical height and identical flow resistance, so that each of the combustible gas streams 9a,9b,9c,9d,9e,9f have about the same flow rate and about the same gas composition and resulting diffusive flux of reactants and reaction products to the cathode-anode-electrolyte unit 5, so that minor or no fluid exchange 9z between the gas streams 9a,9b,9c;9d,9e,9f takes place within the first apertures 15. In addition to the fluid exchange 9z between the three combustible gas streams 9a, 9b, 9c; 9d,9e,9f as described, the first apertures 15 have also the effect, that within the first aperture 15, which is facing the cathode-anode-electrolyte unit 5, the gas composition leaving the streams 9a,9b,9c; 9d,9e,9f are mixed and homogenized, before entering the cathode-anode-electrolyte unit 5. Therefore the gas composition is homogenized before entering the cathode-anode-electrolyte unit 5, which guarantees that unit 5 is provided with a sufficient amount of reactive gas, even if one or even two of the gas streams 9a,9b,9c; 9d,9e,9f provide not sufficient gas. The cathode-anode-electrolyte unit 5 and the second gas contacting and gas diffusion layer 55 arranged on top of the second layer 3 are only schematically shown.

Figure 6E:
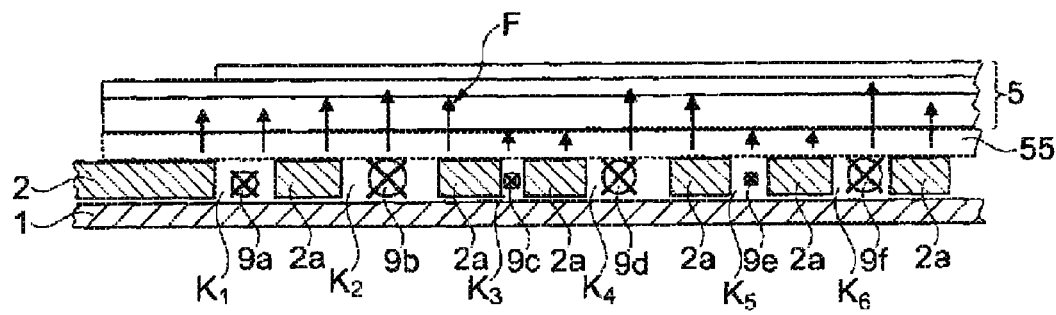
Figure 6F:
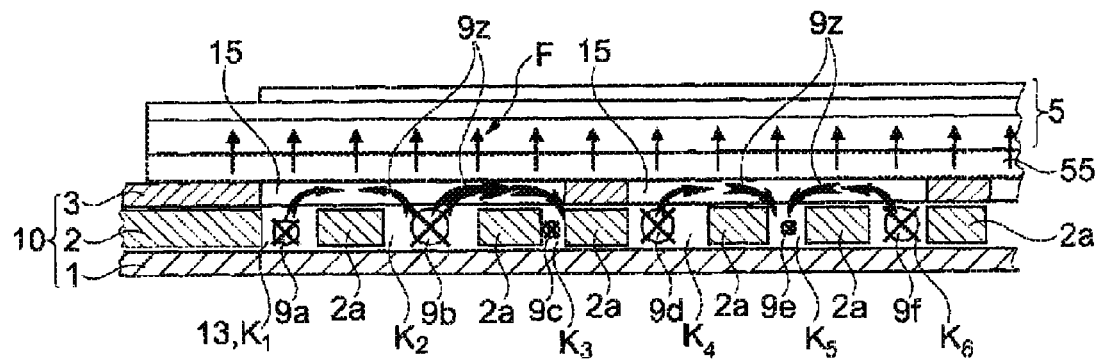

FIG. 6F shows a section along line C-C of FIG. 4 in detail. In contrast to FIG. 6D showing an ideal gas distribution element 10, FIG. 6F shows a common arrangement in which the channels K1 . . . K6 have slightly different shapes, for example a different width, and therefore different flow resistance, which causes the effect, that the gas streams 9a,9b,9c,9d,9e,9f have different flow rates. The advantage of the second layer 3, the homogenizing layer, is, due to the first apertures 15 fluidly connecting some of the channels K1,K2,K3; K4,K5,K6, a fluid exchange 9z occurs between the gas streams 9a,9b,9c,9d,9e,9f so that the difference in flow rate between the gas streams 9a,9b,9c,9d,9e,9f is reduced, which means the gas streams are homogenized, so that the gas composition and resulting diffusive flux of reactants and reaction products of the combustible gas F along the cathode-anode-electrolyte unit 5 is harmonized.

FIG. 6E shows the embodiment according to FIG. 6F, but without the second layer 3. In absence of the homogenizing layer, the gas composition and resulting diffusive flux of reactants and reaction products of the combustible gas F along the cathode-anode-electrolyte unit 5 may strongly vary, depending on the different shapes of the channels K1 . . . K6. One advantage of the second layer 3, the homogenizing layer, therefore is, that the first layer 2 can be manufactures in a cheaper way, because the effect of variances in channel width and/or channel height on the gas streams 9*a*, 9*b*, 9*c*, 9*d*, 9*e*, 9*f* can be compensated by the homogenizing layer, thus allowing to manufacture a cheap and reliable gas distribution element 10.

Figure 6G:
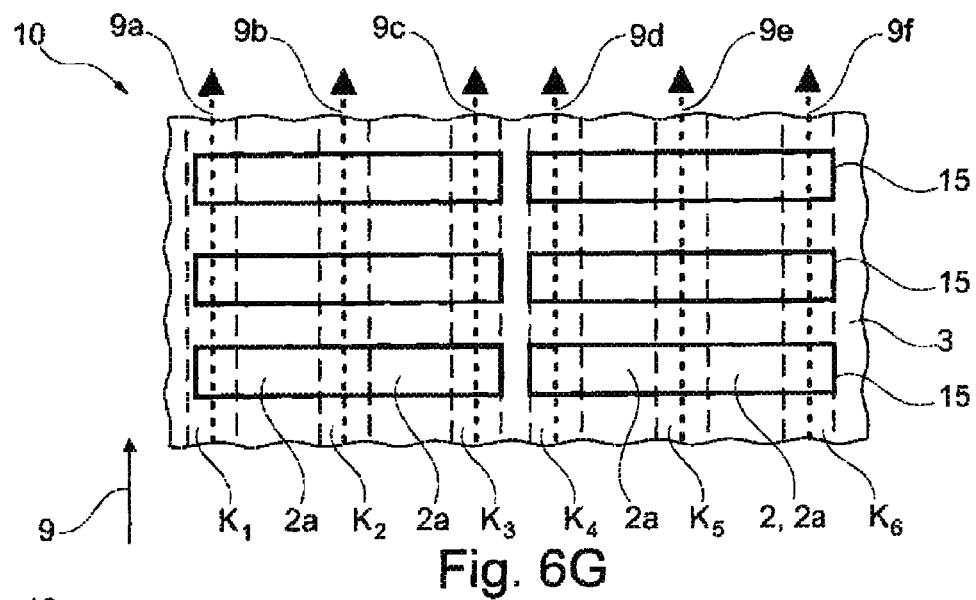

FIG. 6G shows a top view of the first gas distribution element 10 disclosed in FIG. 6D, showing six channels K1 . . . K6 extending in parallel direction, three channels K1,K2,K3; K4,K5,K6 being fluidly connected by apertures 15, whereby each of the gas streams 9*a*,9*b*,9*c*,9*d*,9*e*,9*f* have the same flow rate. A plurality of apertures 15 are arranged and spaced apart in flow direction 9.

Figure 6H:
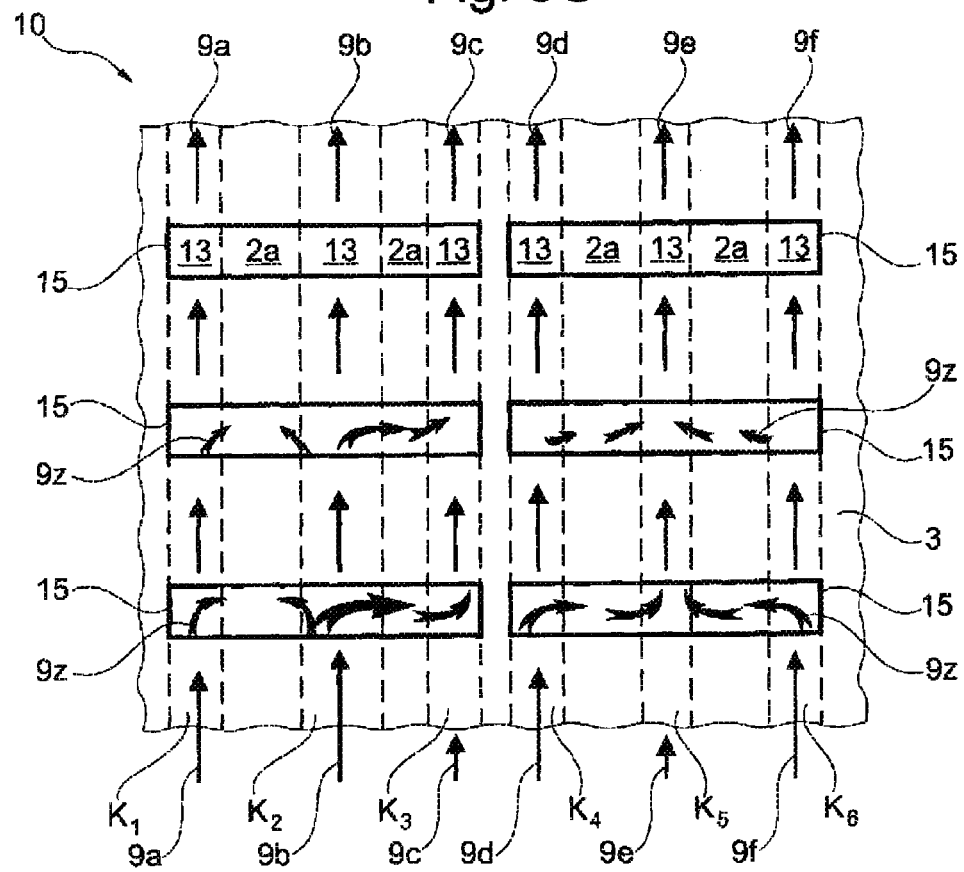

FIG. 6H shows a top view of the first gas distribution element 10 disclosed in FIG. 6F, showing six channels K1 . . . K6 extending in parallel direction, three channels K1,K2,K3; K4,K5,K6 being fluidly connected by apertures 15, whereby gas streams 9*a*,9*b*,9*c*,9*d*,9*e*,9*f* entering the gas distribution element 9 have different flow rates. A plurality of apertures 15 are arranged and spaced apart in flow direction 9, whereby in each of the apertures 15 a fluid exchange 9*z* may occur between the gas streams 9*a*,9*b*,9*c*; 9*d*,9*e*,9*f* so that the difference in flow rate between the gas streams 9*a*,9*b*,9*c*; 9*d*,9*e*,9*f* is reduced. The first gas distribution element 10 comprises the apertures 15 therefore ensure that none of the channels K1 . . . K6 is deprived with gas, and that the cathode-anode-electrolyte unit 5 will not suffer from local depletion of fuel. The homogenizing layer 3 therefore has the effect, that damaging of the fuel cell unit 50 due to lack of combustible gas in some areas of the fuel cell unit 50 is avoided. Moreover, in the apertures 15 a homogenization of compositions by diffusion and convection takes place. This reduces further the risk of having one area of the cell damaged by local depletion of combustible gas, even in the event of having one of the channels K1 . . . K6 e.g. clogged by any unwanted residue. In that case, the gases can circumvent the clogged part of channel through the apertures 15 and the gas diffuse through the aperture 15 above the clogged channel to the electrode.

Figure 6I:
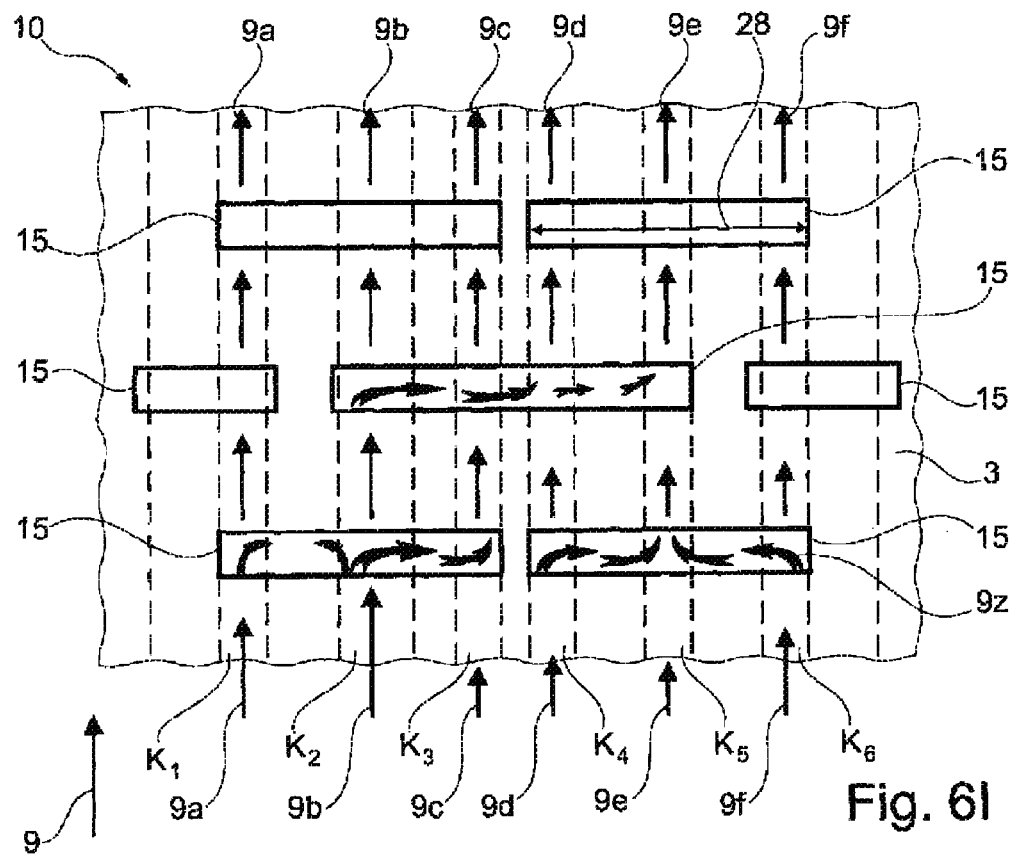

FIG. 6I shows a top view of a further embodiment of a gas distribution element 10, showing six channels K1 . . . K6 extending in parallel direction, the channels K1,K2,K3; K4,K5,K6 being fluidly connected by apertures 15, whereby gas streams 9*a*,9*b*,9*c*,9*d*,9*e*,9*f* entering the gas distribution element 9 have different flow rates. In contrast to the embodiment disclosed in FIG. 6H, the apertures 15 in the embodiment according to FIG. 6I have different length 28, and therefore may fluidly connect two, three, four or even more parallel extending channels K1 . . . K6. In addition, consecutive apertures 15 spaced apart in flow direction 9 may be shifted perpendicular to the direction of flow 9 and/or may have different length 28, therefore connecting different channels K1 . . . K6.

Figure 6K:
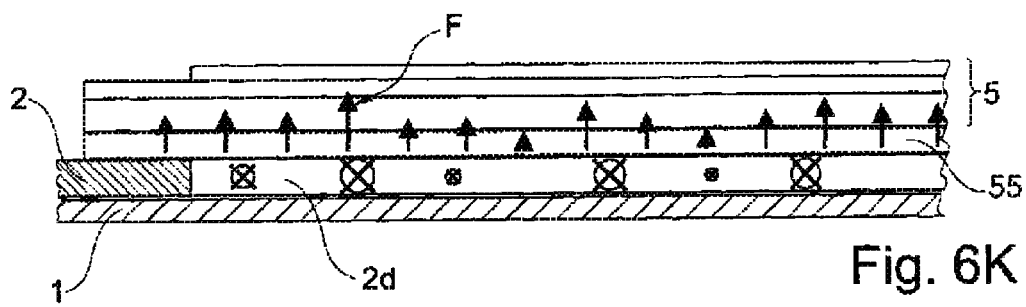
Figure 6L:
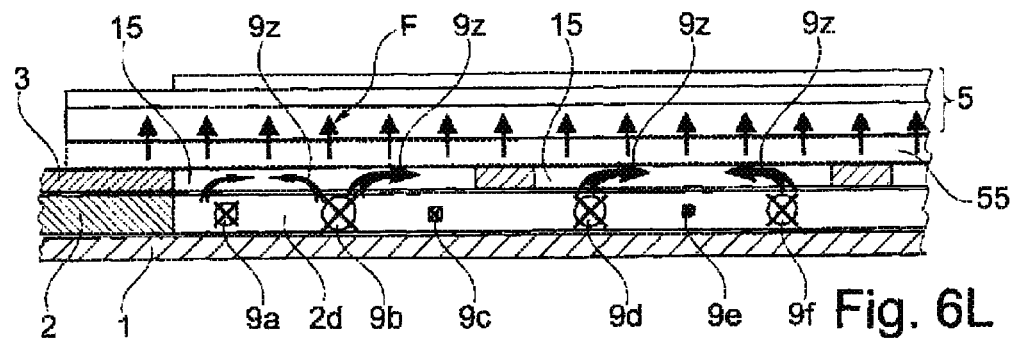

FIG. 6L shows a section along line C-C of FIG. 4C in detail, the first layer 2 comprising a porous structure 2*d* through which the combustible gas 9 flows. In contrast to the first gas distribution element 10 disclosed in FIG. 6F comprising channels K1 . . . K6, the gas flow is more diffuse in the porous layer disclosed in FIG. 6L, therefore the gas streams 9*a*,9*b*,9*c*,9*d*,9*e*,9*f* disclosed in FIG. 6L show only the fuel flow intensity (magnitude) flowing in flow direction 9. The effect of the second layer 3, the homogenizing layer, is similar to the effect disclosed in FIG. 6F, in that the second layer 3 causes a fluid exchange 9*z* between the gas streams 9*a*,9*b*,9*c*,9*d*,9*e*,9*f*, if the gas streams have different gas composition. Therefore the second layer 3 homogenizes the flow rate of the gas various streams 9*a*,9*b*,9*c*,9*d*,9*e*,9*f* in the porous structure of first layer 2. Therefore the gas composition and resulting diffusive flux of reactants of the combustible gas F along the cathode-anode-electrolyte unit 5 is harmonized.

FIG. 6K shows the embodiment according to FIG. 6L, but without the second layer 3. In absence of the homogenizing layer 3, the gas composition and resulting diffusive flux of reactants of the combustible gas F along the cathode-anode-electrolyte unit 5 may strongly vary, depending on flow resistance in the porous first layer 2, similar to the effect disclosed in FIG. 6E.

Figure 7A:
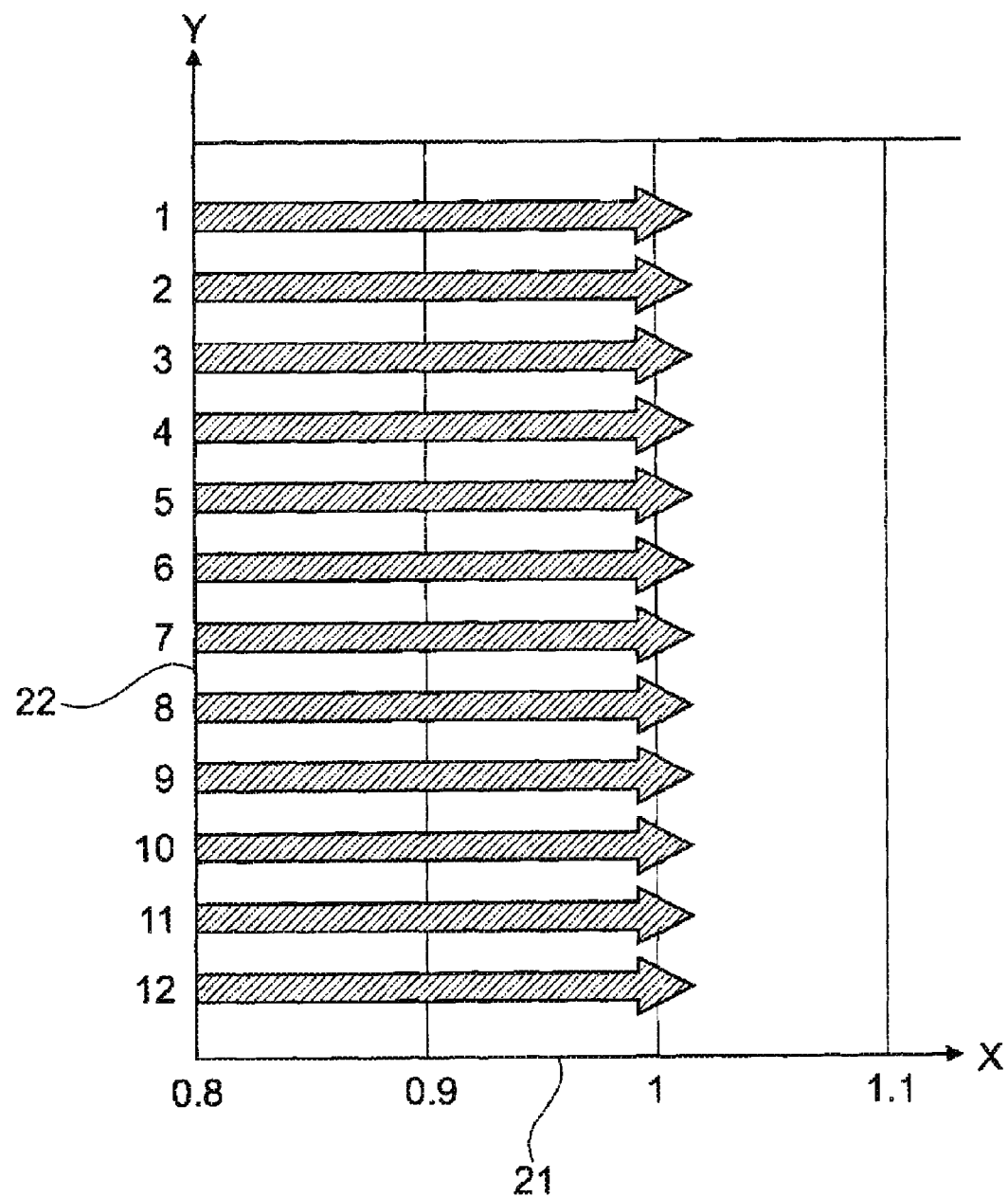
Figure 7B:
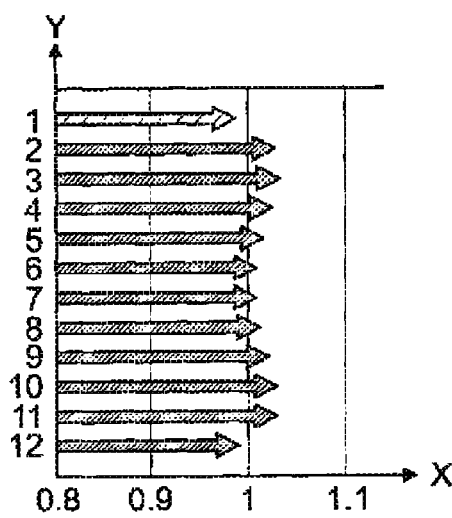
Figure 7D:
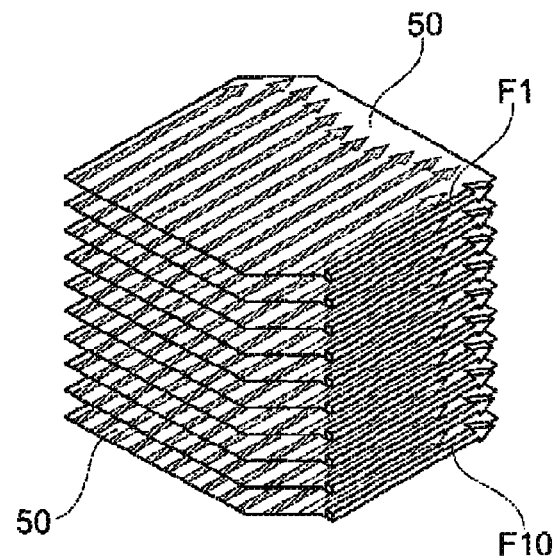

FIG. 7A is a schematic view showing ideal conditions of flow of a combustible gas through a gas distribution layer of a fuel cell unit 50, whereby the fuel cell unit 50 in this example comprises twelve channels 13, laying one beside the other, and whereby the arrows indicate the flux of the combustible gas in the respective channels 13. The x-axis of the coordinate system shows the flux in the respective channel 13 in the main direction of flow 9. The y-axis shows the channel number of twelve channels K1-K12, arranged one beside the other, as indicated in FIG. 3. FIG. 7D shows a stack of ten fuel cell units 50, each fuel cell unit 50 having twelve channels 13, the channel number disclosed in FIG. 7A, 7B corresponds to a channel as shown in the fuel cell stack of FIG. 7D. FIG. 7B is a schematic view showing optimal real conditions of flow of the combustible gas through a fuel cell unit 50, whereby, due to construction compromises in the gas manifolding, the flux of combustible gas is lower on the lateral channels 1 and 12 close to the casing, thus the flow velocity close to the casing of the fuel cell unit 50 having the lowest value.

FIG. 7D is a view on a stack of fuel cell units 50, with each fuel cell unit 50 having an identical flow according to conditions shown in FIG. 7B. Therefore, the average flux F1 to F10 of each of the ten fuel cell units 50 is the same.

Figure 7C:
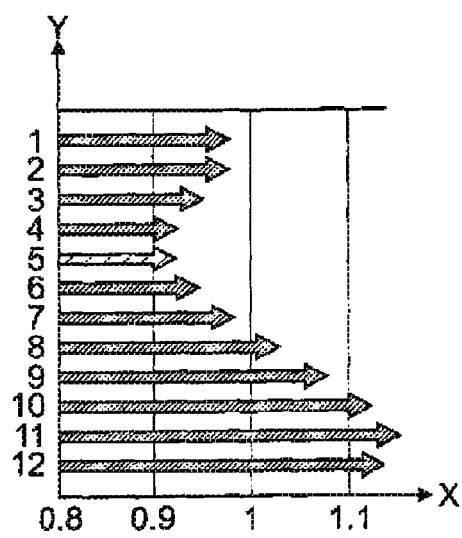

FIG. 7C is a schematic view showing real conditions of flow of the combustible gas through a fuel cell unit according to the prior art, thus a very inhomogeneous distribution of flow velocity. The inhomogeneous distribution of flow velocity occurs for example from production tolerances when manufacturing the fuel cell unit 50. FIG. 7C shows the same designed flow field as in FIG. 7B, but with important deviations from the designed due to for example manufacturing tolerances. This is a typical problem in prior art. The deviations are different from one distribution element to another, depending on its manufacturing. In the example disclosed in FIG. 7C the channel having the lowest gas flux is the number 5, but it can be any other channel in another distribution element. This minimum flux may lead to local fuel starvation and consequently to performance limitations, to local overheating of the fuel cell stack, or even to cracks in the electrolyte, anode or cathode materials, leading possibly to a breakage of the CAE unit 5 and possibly to fuel and oxidant mixing and parasitic combustion, thus a premature severe damage of the stack or at least of parts thereof.

Figure 7E:
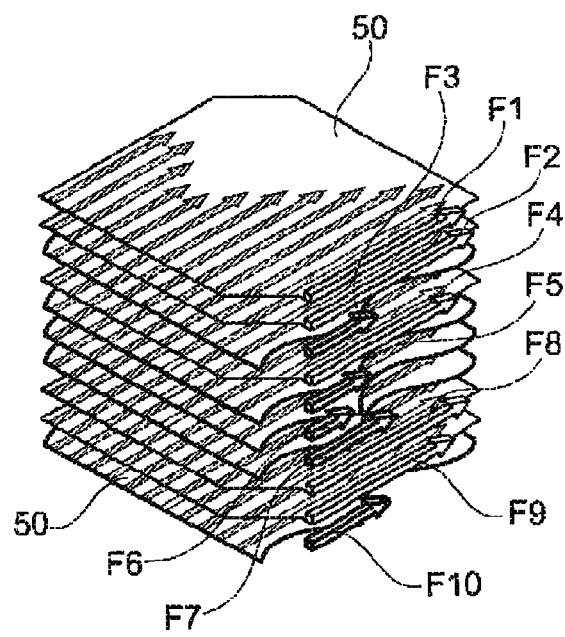

FIG. 7E is a view on a fuel cell stack comprising ten fuel cell units 50 as disclosed in FIG. 7C. The individual fuel cell units 50 present random deviations, with the location of the minimum channel flow varying from one to another, therefore the average flow velocity in each of the fuel cell units 50, indicated by the length of arrows F1 . . . F10, is randomly distributed. These random deviations have a twofold effect: first, the total flux per fuel cell unit varies among units 50 due to different resistances to the fluid flow, and second, the hence cumulated deviation from an average flux per channel (7A, ideal case) becomes consequently more important. For this reason, in prior art, compensations have to be introduced, by correcting the entering flow at the unit cell manifold, by sorting out batches of unit cells with narrow pressure drops, by increasing the specifications for tolerances, or further by reducing the fuel conversion rate to reduce the operational risk. All this has an effect on costs on the production of the stack and on the efficiency of the system. Moreover, FIG. 7E shows that in fuel cell stacks according to the prior art, the flow conditions in neighboring fuel cell units 50, respectively the flow conditions in neighboring gas distribution elements 10 may vary significantly.

Modeling and experimental work on solid oxide fuel cells has shown how important the homogeneity of the fuel distribution and the arrangement of flows are for the performance and reliability of fuel cells. FIG. 7A represents such an ideal case for air and fuel flowing in the same or in the opposite direction. Due to fabrication processes, some compromises are often required, which result in gas distributions that slightly differ from the ideal case as shown in FIG. 7B. The most recent research includes the study of the effect of fabrication tolerances or non-ideal component properties on performance and reliability, thus allowing assessing the suitability of industrial processes or specific designs for the desired performance and reliability.

The work made by Cornu and Wuillemin (Impact of random geometric distortions on the performance and reliability of an SOFC (2011) Fuel Cells, 11 (4), pp. 553-564) shows in particular how the quality of fuel distribution depends on the tolerances of the depth of the channels in the gas distribution structures. The depth of the channels ranges usually from 0.2 mm to the 1-2 mm scale, and their width vary more often from 1 to 2 mm. Depths in the range of 0.5 mm are often found. In such cases, depth variations of 0.05 mm around the targeted value already have a very important impact on flow distribution. An example of such deviation is given in FIG. 7C. Even if depth variations of 0.05 mm can be achieved by appropriate fabrication techniques, the space between the cathode-anode-electrolyte unit 5 and first gas distribution element 10 can also vary depending on the contact layers used in between. The cumulated depth variations for the effective channel sections are therefore very difficult to maintain in the above-mentioned range of deviations. Last, but not least, the contacting layers or channels may creep with time, which will in any case lead to a poor fuel distribution with time.

As unit cells 50 are stacked on top of each other, the defects of the individual elements will cumulate, leading to an even increased deviation of flows in operation which is shown by the case of FIG. 7E.

As exactly the same amount of fuel is converted in all unit cells 50 of the fuel cell stack, thus a common current flow is obtained, so that the areas of the unit cells 50 presenting a low fuel flow are exposed to the risk of fuel starvation when the fuel conversion is increased. As a large conversion is required to reach high performance, a poor fuel distribution will lead to performance limitations or to the damaging of one unit cell due to fuel starvation.

As there is hardly any sign for the operator that part of the fuel cell stack is suffering from starvation unless it is already too late, this kind of problem is of large importance from an industrial and operative point of view.

Figure 8:
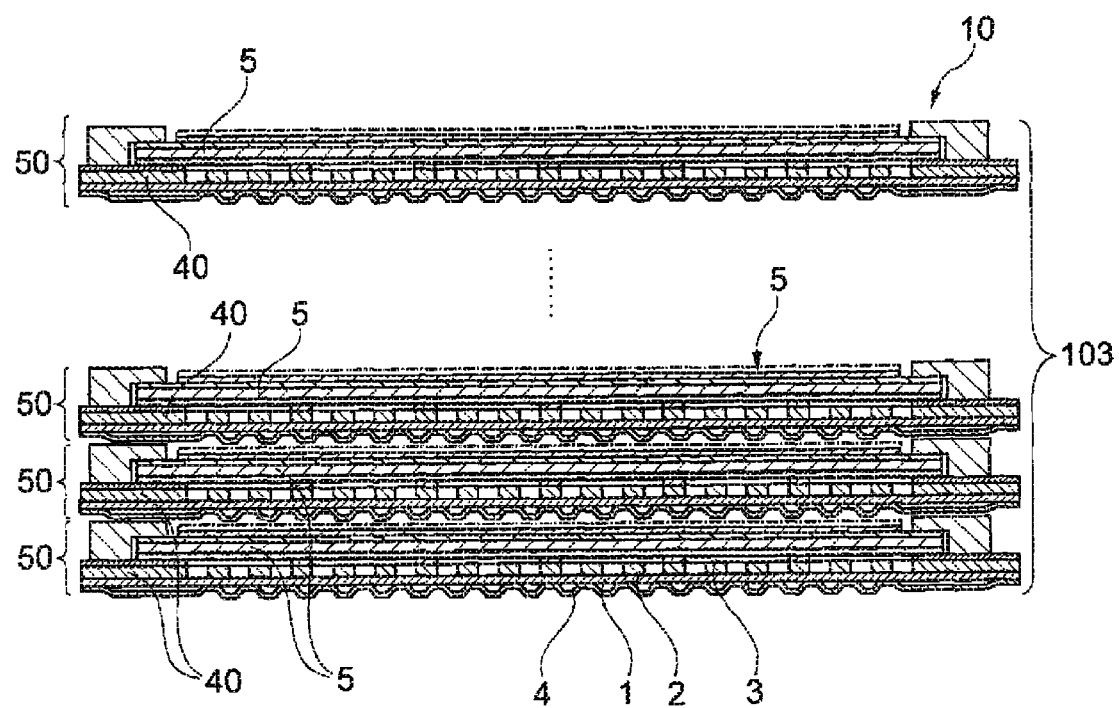
Figure 8A:
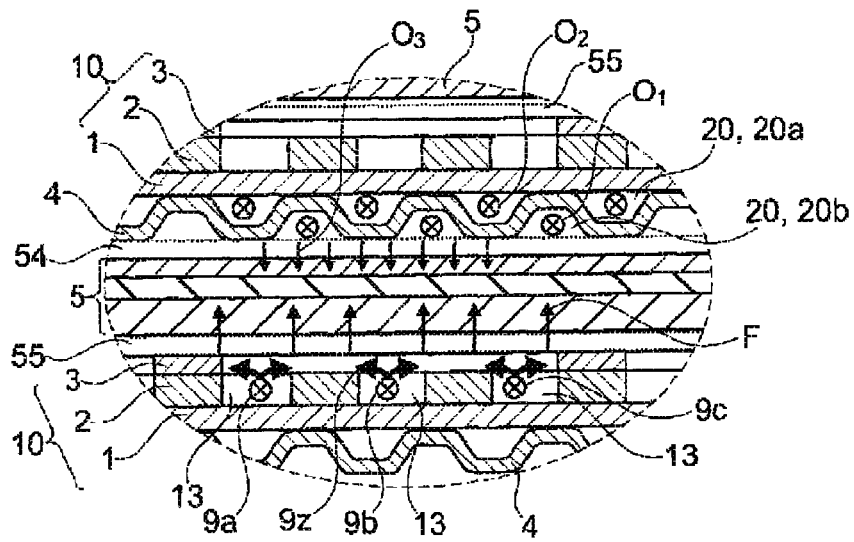

FIG. 8 is a section though a plurality of consecutive fuel cell units 50 forming a fuel cell stack 103, each fuel cell unit 50 comprising a CAE-unit 5 and a interconnect 40, the interconnect 40 comprising a first gas distribution element 10 and a second gas distribution element 4 in accordance with the embodiment as shown in FIG. 4.

Thus, the cross-section of the fuel channels 13 is given and determined by the geometry of the channel structure of the first layer 2 and the second layer 3 being a perforated plate. The second layer 3 being a homogenizing element. Any optional additional contacting layer used between the latter and the cathode-anode-electrolyte unit 5 will have no influence on the flow. Moreover, the geometry of holes 15 on the perforated plate, the second layer 3, allows a fluid exchange and mixing of the fluid along the fluid path of several channels 13, the channels 13 laying one beside the other along the fuel path, hence creating near-isobars among channels at those locations, and hence creating suitable average flux among channels 13. Thanks to this, any deviation of geometry in any channel 13 along the fluid flow path of the combustible gas within the first gas distribution element 10 is corrected by allowing the combustible gas to flow between adjacent channels 13, hence using the averaging effect to homogenize the respective reactant respectively combustible gas fluid flow.

FIG. 8A is a detailed section view of FIG. 8 showing two gas distribution elements 10 with corresponding supporting layers 4 in detail. One cathode-anode-electrolyte unit 5 can be seen in the middle of FIG. 8A, whereby a supporting layer 4 is contacting the first gas contacting and gas diffusion layer 54 on top of the cathode-anode-electrolyte unit 5, and whereby the second layer 3, the homogenizing layer, is contacting the second gas contacting and gas diffusion layer 55 on the bottom of the cathode-anode-electrolyte unit 5. The second layer 3 providing first apertures 15 extending over three channels 13, to fluidly connect the three channels 13, so that a fluid exchange 9z homogenizes the combustion gas F entering the cathode-anode-electrolyte unit 5.

The supporting layer 4 has a corrugated shape, that allows to split the flow path of the oxidizing agent O into two separate flow paths O1, O2, with channels 20b, 20a, the flow paths O1 of channels 20b being the oxidizing agent providing the cathode-anode-electrolyte unit 5 with the oxidizing agent O3. The flow path O2 of channels 20a serves as a tempering agent to cool or heat the base layer 1 and/or the cathode-anode-electrolyte unit 5.

Figure 8B:
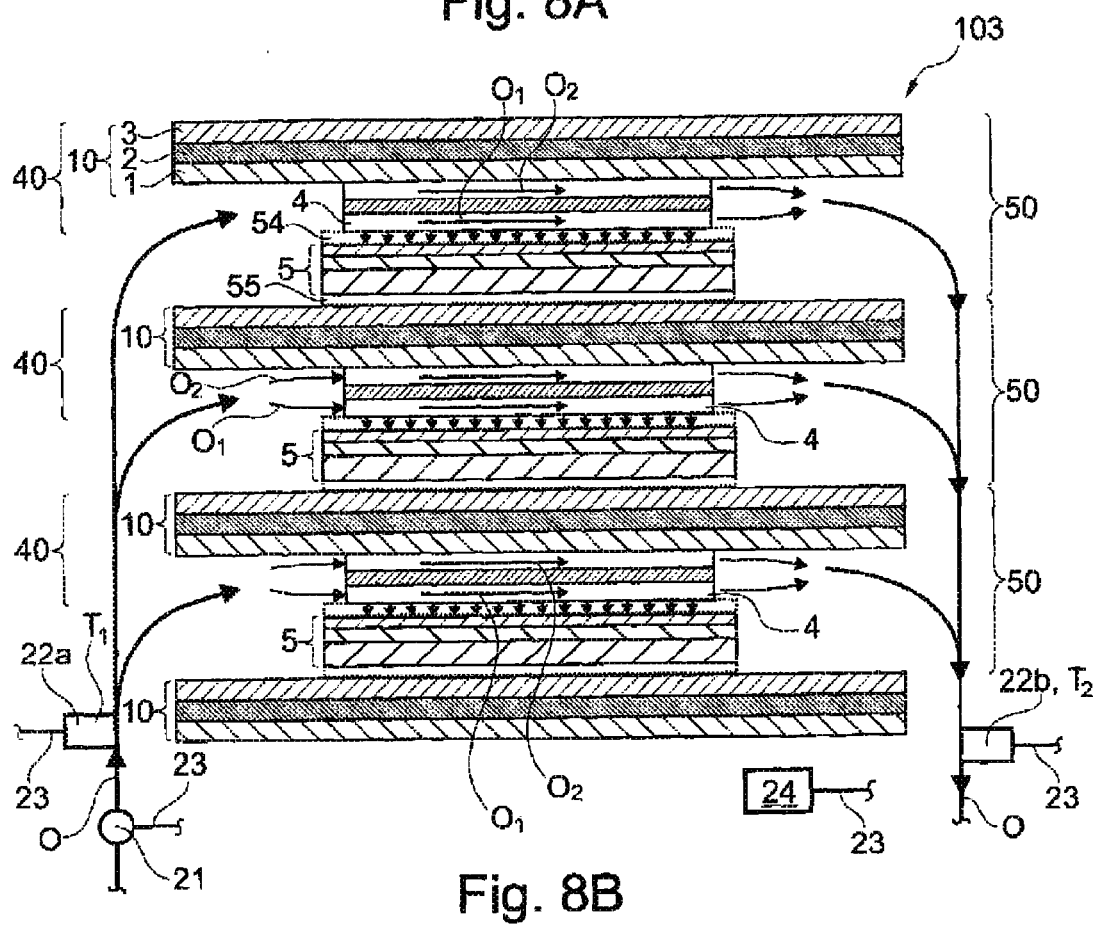

FIG. 8B shows in a section view a schematic side view of a fuel cell stack 103 comprising three fuel cell units 50, each comprising an interconnect 40 and a CAE-unit 5, and each interconnect 40 comprising a first gas distribution element 10 and a second gas distribution element 4. The oxidizing agent O is provided on one side to all of the second gas distribution elements 4, the oxidizing agent O is then split to form two separate flow paths O1, O2 along the second gas distribution elements 4, and the two separate flow paths O1, O2 are combined after leaving the second gas distribution element 4, and the flow paths of all second gas distribution elements 4 are also combined to one single flow path that exits the fuel cell stack 103. FIG. 8B also discloses a blower or compressor 21 to feed the oxidizing agent O, and temperature sensors 22a, 22b to measure the temperature of the oxidizing agent O entering respectively leaving the interconnect 40. The blower or compressor 21 and the temperature sensors 22a, 22b are connected by cables 23 with a control unit 23, which is only schematically shown. Additional temperature sensors or other sensors or actuators could be arranged and could be connected with the control unit 23 to control the operation of the fuel cell stack.

Figure 8C:
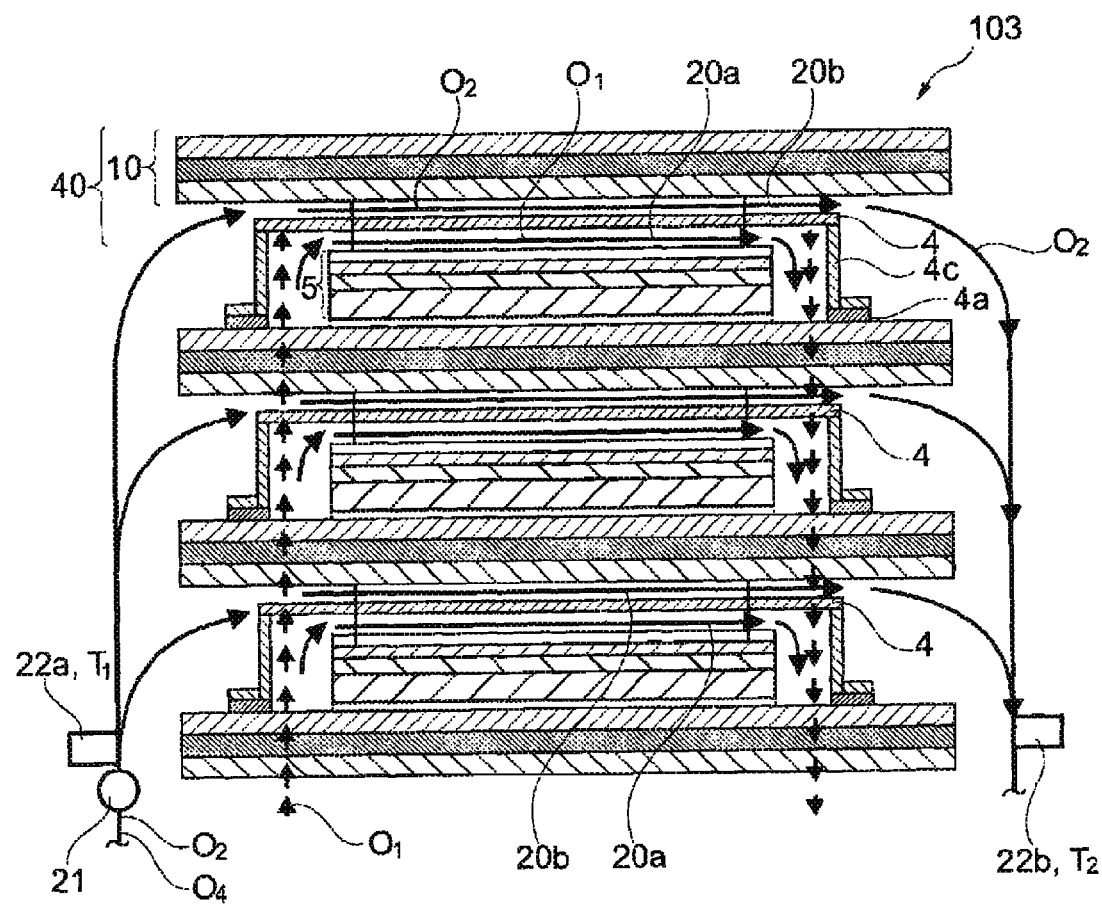

FIG. 8C shows in a section view a schematic side view of a further embodiment of a fuel cell stack 103 comprising three fuel cell units 50, each comprising an interconnect 40 and a CAE-unit 5, and each interconnect 40 comprising a first gas distribution element 10 and a second gas distribution element 4. The flow paths O1, O2 are completely separated, and the oxidizing agent O is provided on one side to only the channels 20a which define the flow path O1 of the oxidizing agent. A tempering fluid O4 is provided on one side to only the channels 20b which define the flow path O2 of the tempering fluid. The flow paths O1, O2 also leave the second gas distribution element 4 as separate paths. FIG. 8C also discloses a blower or compressor 21 to feed the tempering fluid O4, and temperature sensors 22a, 22b to measure the temperature of the tempering fluid path O2 entering respectively leaving the interconnect 40. The blower or compressor 21 and the temperature sensors 22a, 22b are connected by cables 23 with a control unit 23, which is only schematically shown. Additional temperature sensors or other sensors or actuators could be arranged and could be connected with the control unit 23 to control the operation of the fuel cell stack.

A fuel cell stack 103 as disclosed in FIG. 8B or 8C may be operated by various methods. Some advantageous methods are now described in further details.

The fuel cell stack 103 may be operated by a method for operating a solid oxide fuel cell or a solid oxide electrolyzing cell, the solid oxide fuel cell comprising a) a plurality of cathode-anode-electrolyte units 5 and b) a metal interconnect 40 between the CAE-units 5, the interconnect 40 including:

a first gas distribution element 10 comprising a gas distribution structure 11 for the combustible gas, and a second gas distribution element 4 comprising channels 20a for the oxidizing agent and comprising separate channels 20b for a tempering fluid, wherein at least a first and a second control temperatures T1, T2 are measured, the first temperature T1 being the temperature of the tempering fluid entering the second gas distribution element 4 or any representative temperature measured on the tempering fluid inlet side of the fuel cell, and the second temperature T2 being the temperature of one of the exit temperature of the tempering fluid leaving the second gas distribution element 4, the temperature of the fuel cell stack or any representative temperature measured on the tempering fluid outlet side of the fuel cell, wherein the amount of tempering fluid supplied to the second gas distribution element 4 is controlled based on a temperature difference of the first and second temperature T1,T2.

In a preferred method step for operating a solid oxide fuel cell or a solid oxide electrolyzing cell the amount of tempering fluid is supplied to the second gas distribution element 4 and is controlled based on a maximal, a minimal or a nominal temperature difference of the first and second temperature T1, T2.

In a further preferred method step for operating a solid oxide fuel cell or a solid oxide electrolyzing cell the amount and the temperature T1 of the tempering fluid which is supplied to the second gas distribution element 4 is controlled such that the first and second control temperatures T1, T2 are maintained within defined minimum and maximum values.

In a further preferred method step for operating a solid oxide fuel cell the flow rate of the oxidizing agent is maintained in excess of the stoichiometric flow required for the electrochemical reaction, in such a way, that the oxygen partial pressure of the oxidizing agent at the outlet of the channels 20a is more than 5%, and preferably more than 10% of the total pressure of the oxidizing agent.

In a further preferred method step for operating a solid oxide fuel cell or a solid oxide electrolyzing the oxidizing agent and the tempering fluid circulate in strictly separated flow paths O1, O2.

In a further preferred method step for operating a solid oxide electrolyzing the tempering fluid heats the second gas distribution element 4.

In a further preferred method step for operating a solid oxide electrolyzing cell a carrier gas is added into the flow path O1 of the oxidizing agent to collect the generated oxygen, whereas the flow rate of the carrier gas is controlled such as to maintain the oxygen content in the carrier gas leaving the interconnect 40 within a given range.

In a further preferred method step for operating a solid oxide electrolyzing cell the carrier gas is circulated and oxygen is extracted from the carrier gas leaving the interconnect 40, to separately collect oxygen enriched gas.

In a further preferred method step for operating a solid oxide electrolyzing cell pure oxygen is separately collected as it leaves the interconnect (40).

FIG. 4 shows a cathode-anode-electrolyte unit 5 having a length 3a and a width 3b, which defines a contacting surface 3c through which the cathode-anode-electrolyte unit 5 contacts the second layer 3. The second layer 3 comprises the same contacting surface 3c. The first apertures 15 of the second layer 3 are arranged within the contacting surface 3c. In a preferred embodiment the total area of all first apertures 15 is at least 20% of the total area of the apertures 15, 6 and others found within the surface 3c. To provide an even more equal distribution of the combustible gas along the contacting surface 3c, in a more preferred embodiment the total area of all first apertures 15 is at least 20% of the contacting surface 3c, and most preferably about 30% and most preferably between 40% to 50%.

In a preferred embodiment the CAE-unit 5 has a length 3a along the direction of flow 9 and has a width (3b), wherein the ratio of the length 3a to the width 3b preferably being greater than 1, more preferably being greater than 1.5 and most preferably being greater than 2.

The first apertures 15 disclosed are shown with rectangular shape. The first apertures 15 can also have other shapes, such as an elliptic shape. The second layer 3 could also comprise a plurality of first apertures 15 of different shapes, such as for example rectangular and elliptic shapes on the same second layer 3.

An advantageous method for homogenizing a combustible gas in a first gas distribution element 10 of a fuel cell is, that the first gas distribution element 10 comprises a first layer 2 connecting a fuel inlet 2b with a fuel outlet 2c, whereby the fuel is flowing in a direction of flow 9, within the first layer 2, in particular in linear direction, and the first gas distribution element 10 comprises a second layer 3 comprising first apertures 15, the first apertures 15 extending in transverse direction with respect to the direction of flow 9, wherein the combustible gas flowing through the first layer 2 enters the first apertures 15 so that the combustible gas is homogenized within the first apertures 15, and wherein the first apertures 15 are contacting a cathodeanode-electrolyte unit 5, so that the combustible gas from within the first apertures 15 is provided to the cathode-anode-electrolyte unit 5.

In an advantageous method step, at least some of the combustible gas homogenized within the first apertures 15 flows back into the first layer 2.

In a further advantageous method step, the first layer 2 comprises a plurality of channels 13 arranged one beside the other and connecting the fuel inlet 2b with the fuel outlet 2c, the first apertures 15 extending in transverse direction with respect to the channels 13 and fluidly connecting at least two channels 13 arranged one beside the other, wherein the combustible gas, flowing through the respective channels 13, enters the first aperture 15, so that the combustible gas of the respective channels 13 is homogenized within the first aperture 15.

In an advantageous method step at least some of the combustible gas homogenized within the first apertures 15 flows back into the respective channels 13 of the first layer 2 or is exchanged between the respective channels 13 of the first layer 2.

In an advantageous method step at least some the first apertures 15 extend perpendicular to the direction of flow 9 so that the pressure of the combustible gas in the respective first aperture 15 is equalized, so that the pressure of the combustible gas in the underlying first layer 2 or in the underlying respective channels 13 is equalized locally.

The structure was implemented in two stack designs according to U.S. Pat. No. 7,632,586 B2 and validated in operation. A maximum fuel conversion of 94% was attained with efficiencies reaching 61% using hydrogen as fuel and 69% using methane. This is far above earlier results based on the handling of reactant flow as disclosed in U.S. Pat. No. 7,632,586 B2.

Due to the exothermic reaction in the fuel cell unit, an active cooling of the fuel cell units 50 is therefore required, in particular during a transition phase, which can be principally achieved by air cooling, or by a combination of air cooling and internal cooling on the fuel side by using the endothermic steam-reforming reaction of methane (SMR). This is however limited to the class of systems using steam-reformed methane as fuel.

To limit temperature gradients and excessive temperature differences in the CAE-unit 5 and in the gas distribution structures, a proper distribution of the cooling air in the unit cell 50 is required. To limit temperature differences, a large excess of cooling air is required with respect to the amount that would be necessary for the electrochemical reaction itself. This excess air implies additional losses in the balance of plant, in particular due to the power consumption of the air blowers. These losses can however be reduced if the pressure drop in the stack is low, that means, if the gas distribution structure for the air in the stack presents a low resistance to the air flow. The fuel cell is therefore operated with a nominal pressure difference between its oxidant stream inlets and outlets of preferably less than 50 mbar, resp. 20, resp. 10 mbar.

A problem which should be avoided with fuel cell stacks is local temperature peaks developing on the surface of an electrode, which usually forms a planar layer. If such local temperature peaks occur, the reaction kinetics may be altered and a local hot spot may be formed. Such a hot spot is undesired because it involves a high strain on the materials, by causing a local thermal expansion, which may lead to thermal stress, warpage, buckling or deformations of the layer materials affected. Due to the fact that the ceramics materials of the electrodes or the electrolyte are brittle, they may be subject to cracks and eventually break if subjected to substantial local temperature variations. The occurrence of such hotspot can be drastically reduced by increasing the cooling air flow, and by proper design of the air distribution structure that contacts the CAE unit and hence can serve as heat dissipating structure.

Furthermore, temperature gradients within the fuel cell unit can result in inappropriate thermal stress at other critical locations than in the CAE unit, such as in the seals used around the cell and in the fuel manifolds which distribute the fuel in the stack. This may lead to delamination of the seals and detrimental leaks, both leading possibly to a local or complete breakage of the CAE unit.

It is possible to operate the fuel cell with reduced air flows, but with the consequence to reach larger temperature differences between air inlet and outlet. The drawback of this situation is that the cold side will suffer from less-efficient electrochemical reactions, as most of the electrochemical processes are thermally activated. It is known that some electrode types, in particular some cathode materials, will degrade more severely with time in such conditions. On the other hand, the hotter end of the fuel cell will experience other types of degradation that are thermally activated, e.g. the growth of oxide scales on metal parts.

A further important point for the performance of the fuel cell is the homogeneity of temperatures perpendicularly to the main direction 9 of fuel flow. It seems that stacks having an air flow perpendicular to the fuel flow (so called cross-flow configuration) present important temperature differences perpendicularly to the fuel flow, leading to a lack of fuel consumption along the cell on the colder side due to reduced electrochemical performances. This leads to the impossibility to operate the stack at high fuel conversion rates, and hence to reduced efficiency. This problem can be partly circumvented by using thick interconnectors to enhance the internal heat transfer, but at the expense of weight and extra cost.

It is therefore preferable to operate the fuel cell with the fuel and air flows flowing in parallel or in opposite directions. Nevertheless, thermal gradients can occur on the lateral sides of the fuel stream, in the vicinity of the boundaries of the stack, due to heat exchange with the rest of the system. A similar problem of performance limitation may therefore occur in such situations. Therefore, it is of interest to operate the fuel cell with a large excess of air which will help reducing such types of gradients. For the same purpose, it is of interest to build the fuel cell in such a way that the length of the reactive area of the cell along the fuel flow is greater than the width, that is, having an aspect ratio greater than one. In preferred constructions, this aspect ratio is greater than 1.2, preferably greater than 1.5, and preferably greater than 2.

Therefore, it is of interest to reduce thermal gradients and temperature differences within a fuel cell unit to increase the performance and limit degradation.

Moreover, at low coolant flows larger temperature differences are expected between the core of the stack and its boundaries e.g. first and last fuel cell unit. This is not only detrimental for thermomechanical reasons, but also due to the fact that the electrochemical performance will vary from one location to another similarly disposed in the stack. As a maximum temperature has usually to be respected within the stack, e.g. to preserve sealing materials, some parts of the fuel cell will have to be operated at lower temperatures than needed, with the result that the colder elements will operate at lower efficiencies and the overall performance will be reduced.

Finally, the dynamic control of the fuel cell is enhanced when using larger coolant flows, since faster responses can be obtained and the controllability improved.

One drawback of the use of excess air however is the transport of poisoning species onto the air electrode. Especially volatile chromium is known to be released by the metallic components situated upstream of the stack and transported into the stack by the air stream. The volatile chromium tends to deposit in the air electrodes by electrochemical and chemical reactions. In particular, volatile chromium reacts spontaneously with the strontium contained in the electrodes. Moreover, it can be deposited electrochemically as chromium oxide at the electrode/electrode interface, hence reducing the number of reacting sites. Not only chromium, but also silicon, sulfur and other species are known to further affect the durability of the air electrode.

Therefore, it would of particular advantage to have the possibility to operate a fuel cell with increased air flows for homogeneous tempering, while having a low pressure drop on the oxidant stream to lower the auxiliary losses, and whereas only part of the air is put in contact with the air electrode to prevent pollution.

Moreover, it would be advantageous to have the possibility to vary the ratio between the coolant air and the reactive air, such as to operate the fuel cell at optimal performance and reduced pollution of the air electrode.

In the electrolysis mode, it can be of further advantage to separate the oxygen-rich gas obtained from the electrolysis reaction, from the tempering stream, in order to enable the storage of oxygen-rich gas as reaction product. In the electrolysis mode, the tempering stream is used to heat up the stack, to provide heat to the endothermic electrolysis reaction when needed, and eventually to remove heat at some operating points where the overall operation may become exothermic.

This separation is further advantageous for future applications where the fuel cell can be used reversibly in generator and electrolysis mode, e.g. for storage of renewable energy during peak production and later re-use of reaction products in generator mode, including oxygen-enriched gas as oxidant.

What is claimed is:

1. A method for operating a solid oxide fuel cell or a solid oxide electrolyzing cell, the solid oxide fuel cell or the solid oxide electrolyzing cell having: a) a plurality of cathode-anode-electrolyte units, each CAE-unit including a first electrode for an oxidizing agent, a second electrode for a combustible gas, and a solid electrolyte between the first electrode and the second electrode, and b) a metal interconnect is disposed between adjacent CAE-units, the interconnect including: a first metallic gas distribution element comprising a gas distribution structure for the combustible gas, and a second metallic gas distribution element comprising channels for the oxidizing agent and comprising separate channels for a tempering fluid, wherein the channels split the oxidizing agent (O) into two flow paths (O1, O2), a channel for an oxidizing agent (O1) and a channel for a tempering fluid (O2), the method comprising:

introducing a tempering fluid (O2) which contacts and cools the second gas distribution element and a base layer of the first gas distribution element, contacting the first electrode of an adjacent CAE-unit with an oxidizing agent (O1), measuring at least a first and a second control temperatures (T1, T2), where the first temperature (T1) being the temperature of the tempering fluid (O2) entering the second gas distribution element or any representative temperature measured on a tempering fluid inlet side of the fuel cell, the second temperature (T2) being the temperature of one of:

an exit temperature of the tempering fluid leaving the second gas distribution element, the temperature of the fuel cell stack, or any representative temperature measured on the tempering fluid outlet side of the fuel cell, and controlling the amount of tempering fluid (O2) supplied to the second gas distribution element based on a temperature difference between the first and second temperature (T1,T2).

2. The method for operating a solid oxide fuel cell or a solid oxide electrolyzing cell according to claim 1, wherein the amount of tempering fluid supplied to the second gas distribution element is controlled based on a maximal, a minimal or a nominal temperature difference between the first and second control temperatures (T1, T2).

3. The method for operating a solid oxide fuel cell or a solid oxide electrolyzing cell according to claim 2 where the amount and the temperature (T1) of the tempering fluid supplied to the second gas distribution element is controlled such that the first and second control temperatures (T1, T2) are maintained within defined minimum and maximum values.

4. The method for operating a solid oxide fuel cell or a solid oxide electrolyzing cell according to claim 1 where the flow rate of the oxidizing agent is maintained in excess of the stoichiometric flow required for a electrochemical reaction, such that the oxygen partial pressure of the oxidizing agent at the outlet of the channels is more than 5% of the total pressure of the oxidizing agent.

5. The method for operating a solid oxide fuel cell or a solid oxide electrolyzing cell according to claim 1, wherein the oxidizing agent and the tempering fluid circulate in strictly separated flow paths (O1, O2).

6. The method for operating a solid oxide electrolyzing cell or a solid oxide electrolyzing cell according to claim 5, wherein the tempering fluid heats the second gas distribution element.

7. The method for operating a solid oxide electrolyzing cell or a solid oxide electrolyzing cell according to claim 6, where a carrier gas is added into the flow path (O1) of the oxidizing agent to collect generated oxygen, whereas flow rate of the carrier gas is controlled to maintain the oxygen content in the carrier gas leaving the interconnect within a given range.

8. The method for operating a solid oxide electrolyzing cell or a solid oxide electrolyzing cell according to claim 7, wherein the carrier gas is circulated and oxygen is extracted from the carrier gas leaving the interconnect, to separately collect oxygen enriched gas.

9. The method for operating a solid oxide electrolyzing cell or a solid oxide electrolyzing cell according to claim 6, where oxygen is separately collected as it leaves the interconnect.

* * * * *